(12) United States Patent
Choi et al.

(10) Patent No.: US 11,842,634 B2
(45) Date of Patent: Dec. 12, 2023

(54) IMAGE DETECTION DEVICE, SIGNAL CONTROL SYSTEM COMPROMISING SAME AND SIGNAL CONTROL METHOD

(71) Applicant: LAON ROAD INC., Seongnam-si (KR)

(72) Inventors: Tae Wook Choi, Seongnam-si (KR); Jung Woo Hwang, Seoul (KR); Kyungjean Bae, Seoul (KR); Hyun Woo Cho, Seongnam-si (KR); Gun Woo Jang, Seongnam-si (KR); Hee Bin Lee, Incheon (KR)

(73) Assignee: LAON ROAD INC., Seongnam-si (KR)

( * ) Notice: Subject to any disclaimer, the term of this patent is extended or adjusted under 35 U.S.C. 154(b) by 260 days.

(21) Appl. No.: 17/422,980

(22) PCT Filed: Sep. 14, 2020

(86) PCT No.: PCT/KR2020/012360
§ 371 (c)(1),
(2) Date: Jul. 14, 2021

(87) PCT Pub. No.: WO2021/085847
PCT Pub. Date: May 6, 2021

(65) Prior Publication Data
US 2022/0076569 A1 Mar. 10, 2022

(30) Foreign Application Priority Data

Oct. 28, 2019 (KR) .......................... 10-2019-0134923

(51) Int. Cl.
*G06K 9/00* (2022.01)
*G08G 1/07* (2006.01)
(Continued)

(52) U.S. Cl.
CPC ................. *G08G 1/07* (2013.01); *G06N 3/02* (2013.01); *G06T 7/70* (2017.01); *G06V 20/54* (2022.01);
(Continued)

(58) Field of Classification Search
CPC .................................................... G08G 1/0116
See application file for complete search history.

(56) References Cited

U.S. PATENT DOCUMENTS

| 10,308,246 | B1* | 6/2019 | Konrardy | B60R 25/104 |
| 2010/0123778 | A1* | 5/2010 | Hada | B60W 50/14 |
| | | | | 348/148 |

(Continued)

FOREIGN PATENT DOCUMENTS

| KR | 1999-026306 A | 4/1999 |
| KR | 20-0316081 Y1 | 6/2003 |

(Continued)

*Primary Examiner* — Hadi Akhavannik
(74) *Attorney, Agent, or Firm* — Sughrue Mion, PLLC

(57) ABSTRACT

Proposed herein are an image detection device, a signal control system including the same, and a signal control method. The image detection device includes: a photographing unit configured to acquire an intersection image by capturing an image of an intersection; a control unit configured to generate detection information, including information about a vehicle-occupied or -unoccupied state for each of one or more detection channels set on the plane of the intersection by analyzing the intersection image acquired by the photographing unit; and a communication unit configured to transmit the detection information, generated by the control unit, to the traffic signal controller.

13 Claims, 19 Drawing Sheets

(51) Int. Cl.
*G06T 7/70* (2017.01)
*G06V 20/54* (2022.01)
*G06N 3/02* (2006.01)

(52) U.S. Cl.
CPC ............... *G06T 2207/20076* (2013.01); *G06T 2207/20084* (2013.01); *G06T 2207/30236* (2013.01); *G06V 2201/08* (2022.01)

(56) References Cited

U.S. PATENT DOCUMENTS

| | | | | |
|---|---|---|---|---|
| 2012/0146811 A1* | 6/2012 | Chou | ............... | G08G 1/096783 340/905 |
| 2014/0309976 A1* | 10/2014 | Kamarianakis | ...... | G08G 1/0141 703/6 |
| 2019/0176844 A1* | 6/2019 | Sedlmayr | ............... | G08G 1/162 |

FOREIGN PATENT DOCUMENTS

| KR | 10-2010-0127074 A | 12/2010 |
|---|---|---|
| KR | 10-2011-0088148 A | 8/2011 |
| KR | 10-2011-0136182 A | 12/2011 |
| KR | 10-1128906 B1 | 3/2012 |
| KR | 10-2015-0032437 A | 3/2015 |
| KR | 10-2017-0074076 A | 6/2017 |
| KR | 10-1942491 B1 | 1/2019 |
| KR | 10-2019-0080818 A | 7/2019 |

* cited by examiner

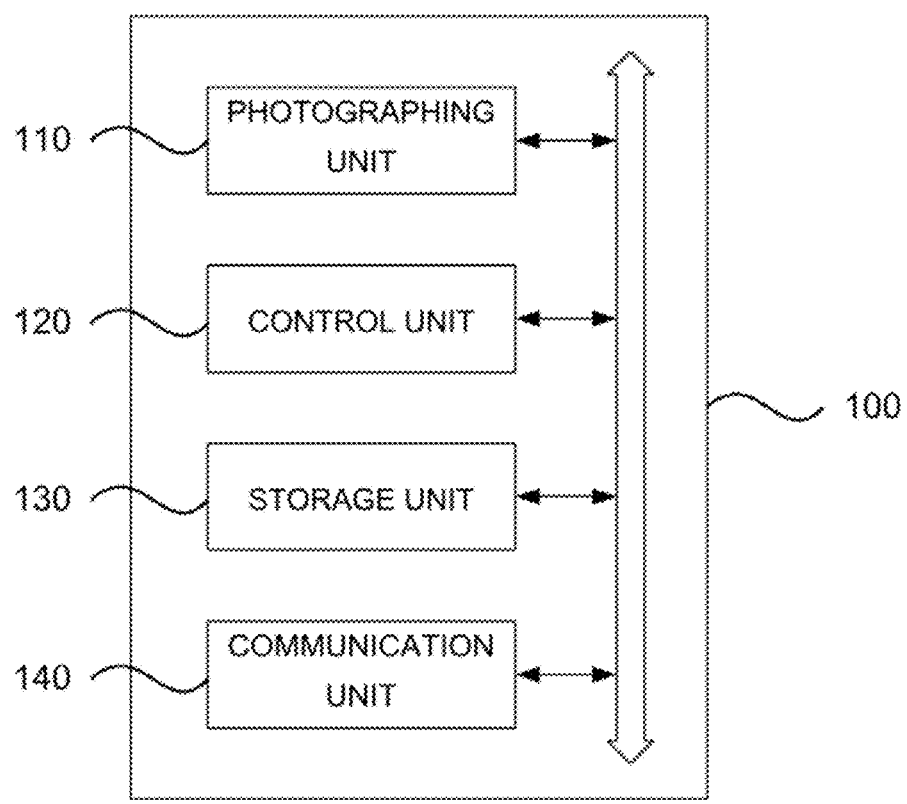
[FIG.1]

[FIG.2]
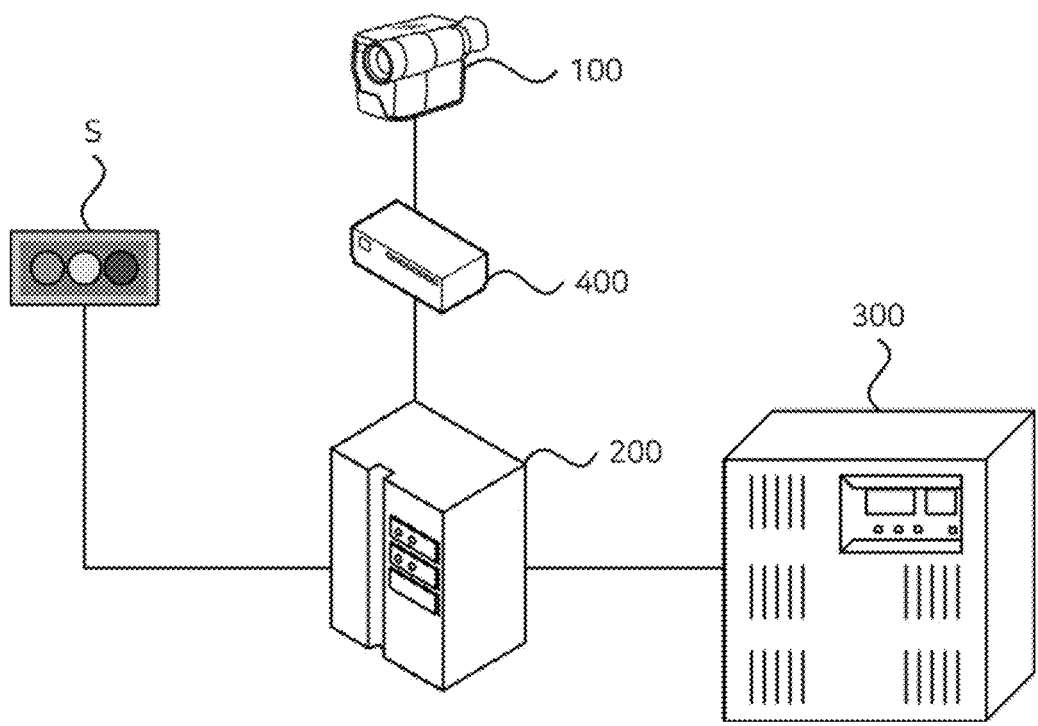

[FIG.3]
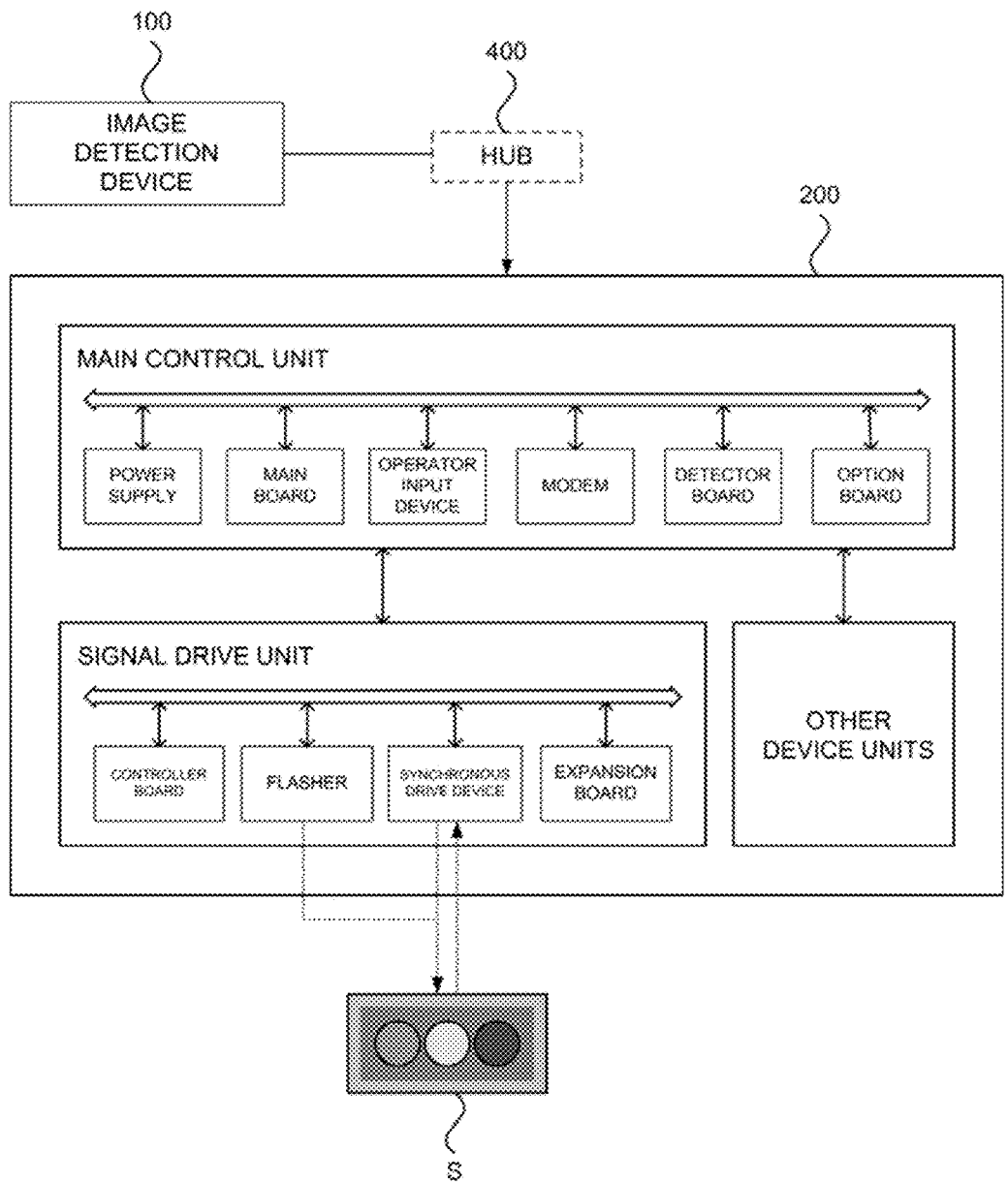

[FIG.4]
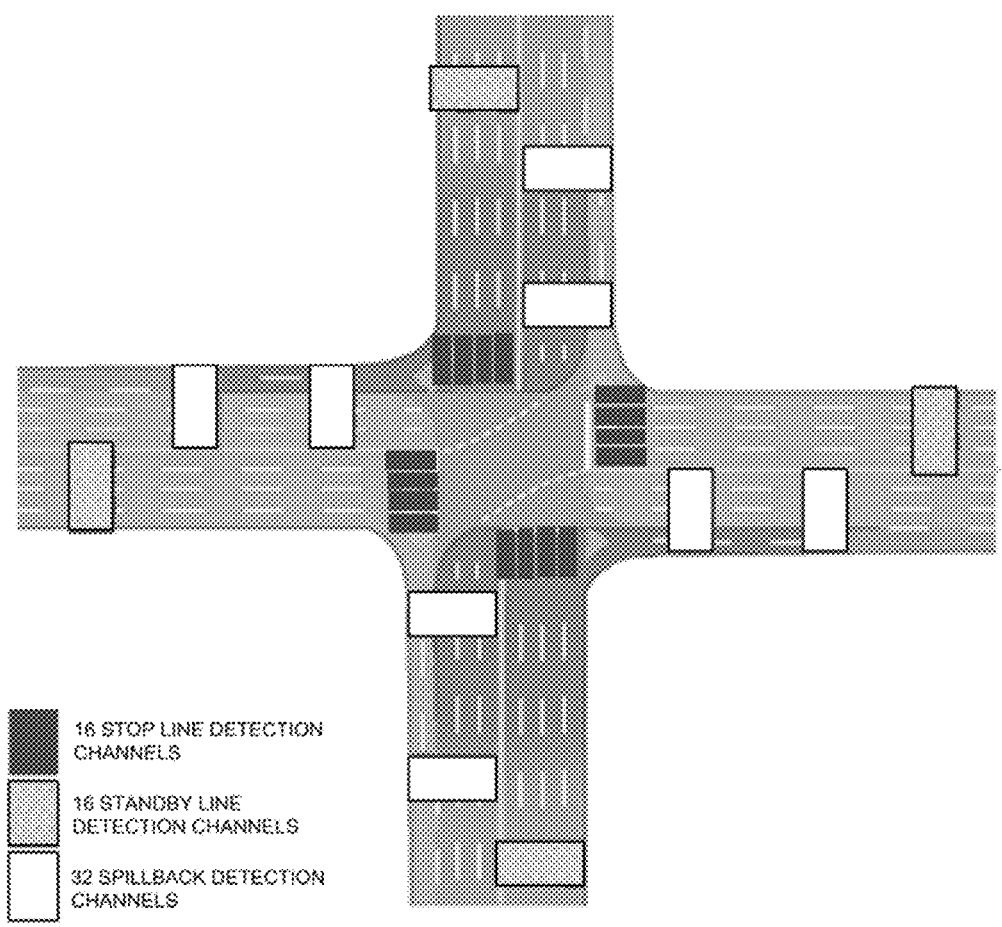

[FIG.5]
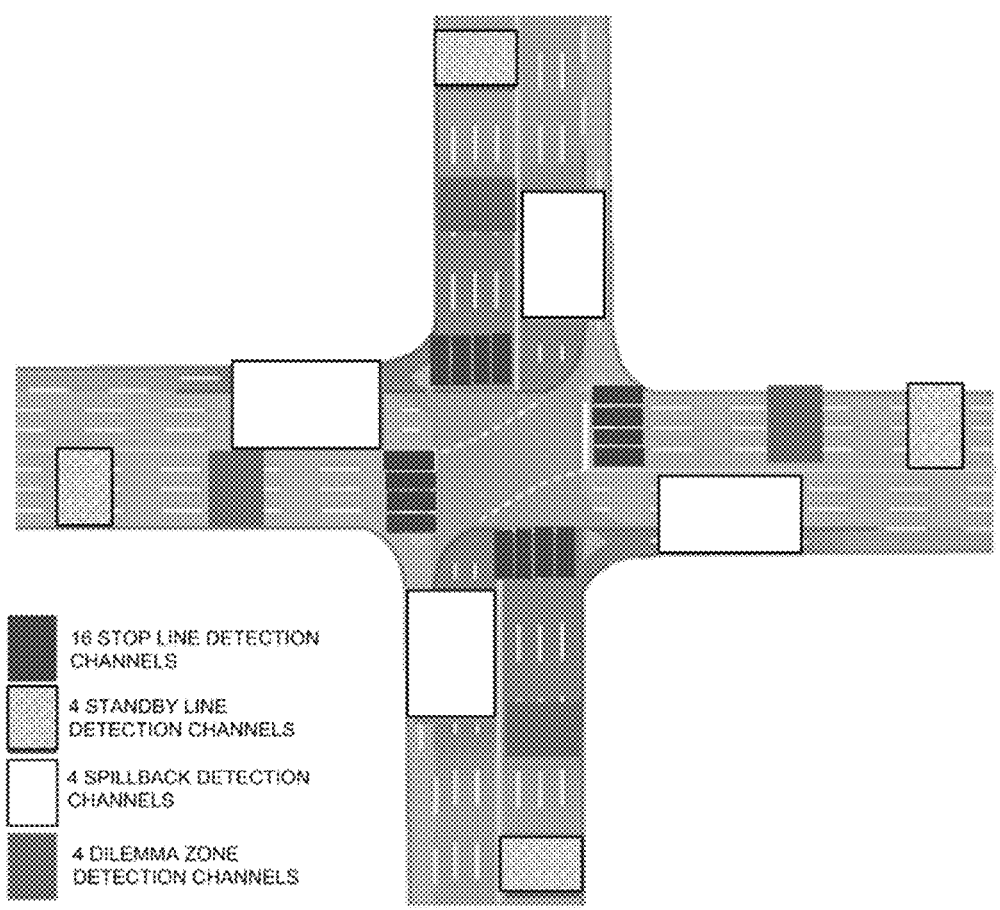

[FIG.6]

| DETECTION DEVICE DATA AREA | | | | | | MANUFACTURER DATA AREA |
|---|---|---|---|---|---|---|
| BYTE 0 | BYTE 1 | BYTE 2 | BYTE 3 | BYTE 4 | BYTE 5 | BYTE 4 - 31 |
| FFFF0000 | FFFF0001 | FFFF0002 | FFFF0003 | FFFF0004 | FFFF0004 | FFFF0004 - FFFF001F |
| CHANNELS 1, 2 | CHANNELS 3, 4 | CHANNELS 5, 6 | CHANNELS 7, 8 | 01H=8CH 00H,FFH=4 CH | MANUFACTURER CODE | USER DATA |

| BYTE 0 DATA FORMAT | | | | | | | |
|---|---|---|---|---|---|---|---|
| CHANNEL 1 (4 BIT) | | | | CHANNEL 2 (4 BIT) | | | |
| BIT0 | BIT1 | BIT2 | BIT3 | BIT5 | BIT6 | BIT7 | BIT8 |
| OCCUPANCY | DISCONNECTION | SHORT CIRCUIT | OSCILLATION | OCCUPANCY | DISCONNECTION | SHORT CIRCUIT | OSCILLATION |
| 0: UNOCCUPIED 1: OCCUPIED | 0: NORMAL 1: DISCONNECTED | 0: NORMAL 1: SHORT-CIRCUITED | 0: NORMAL 1: BAD | 0: UNOCCUPIED 1: OCCUPIED | 0: NORMAL 1: DISCONNECTED | 0: NORMAL 1: SHORT-CIRCUITED | 0: NORMAL 1: BAD |

[FIG.7]
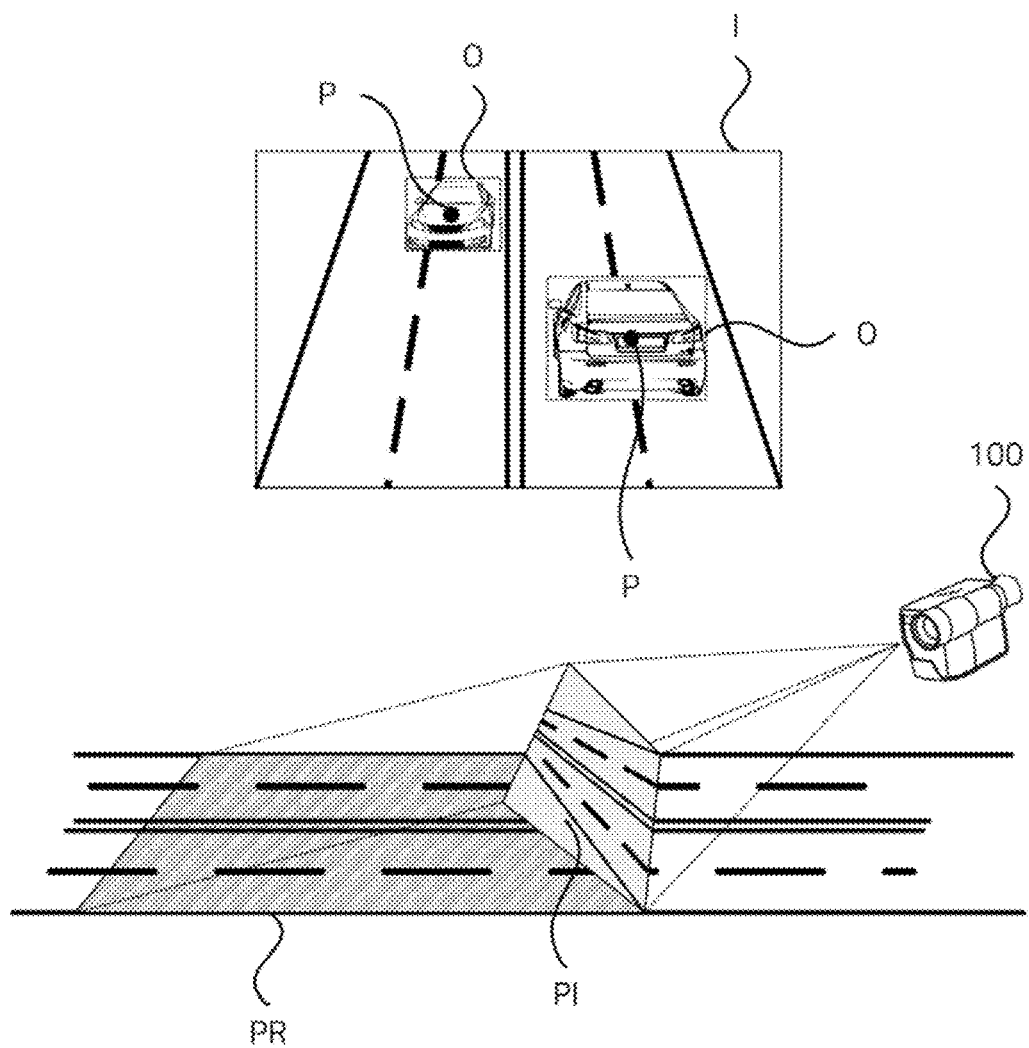

[FIG.8]
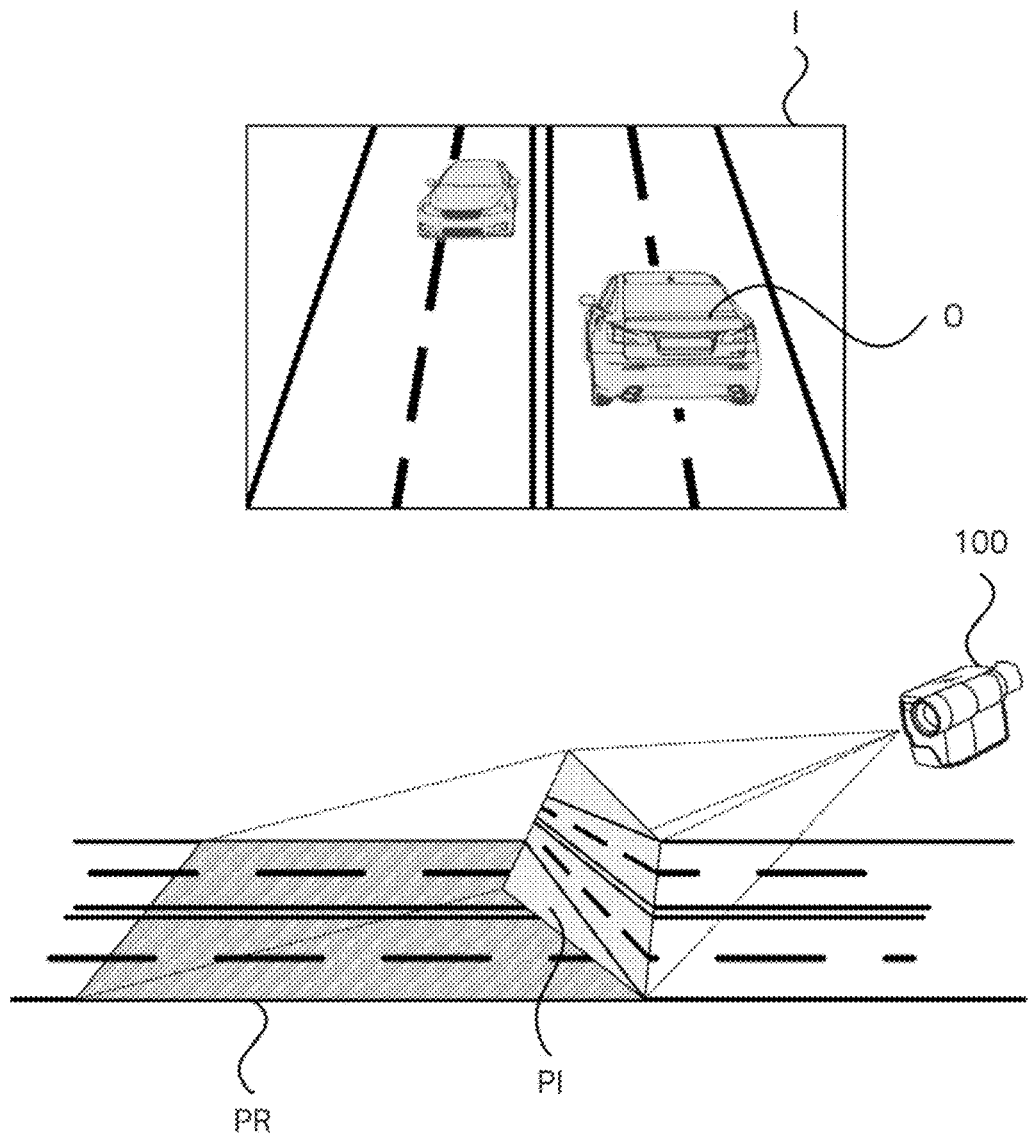

[FIG.9]
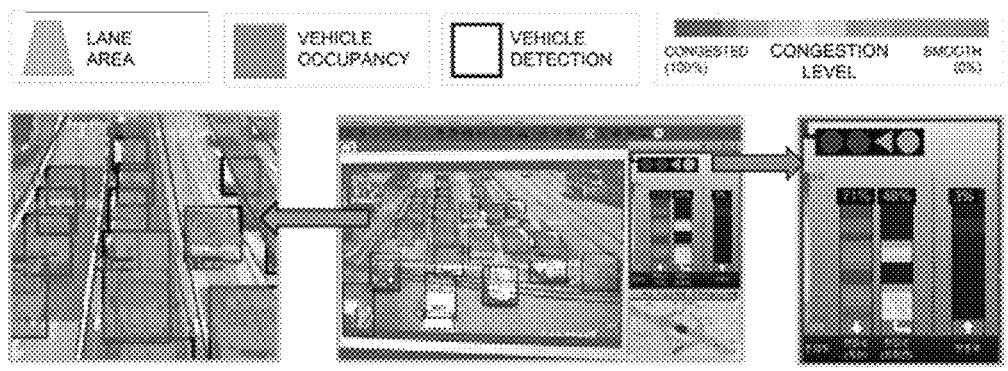

[FIG.10]
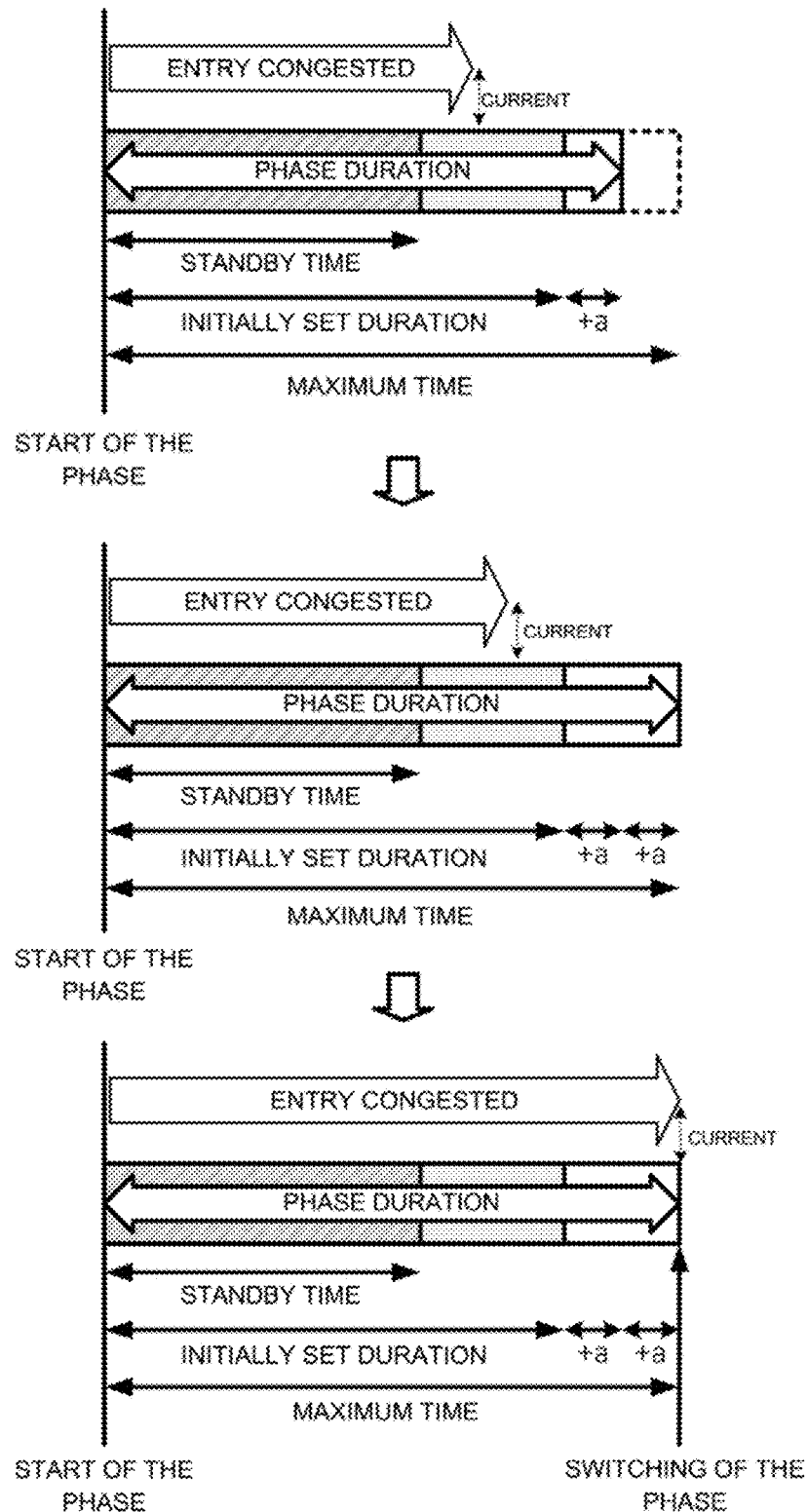

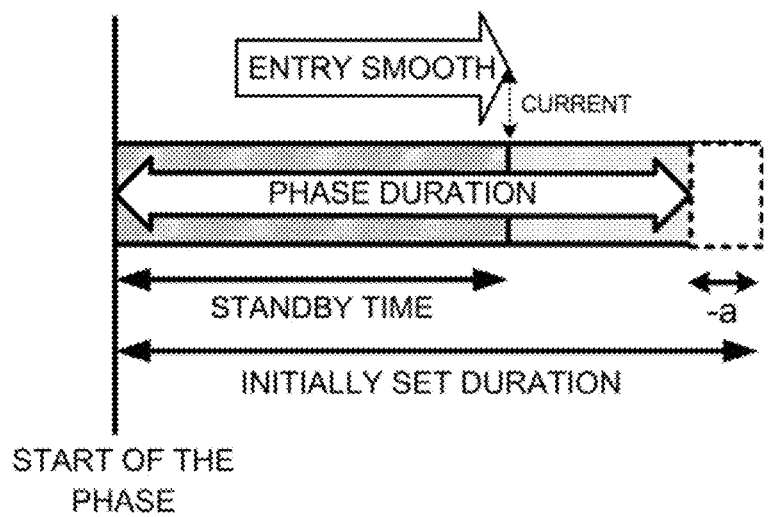
[FIG.11]

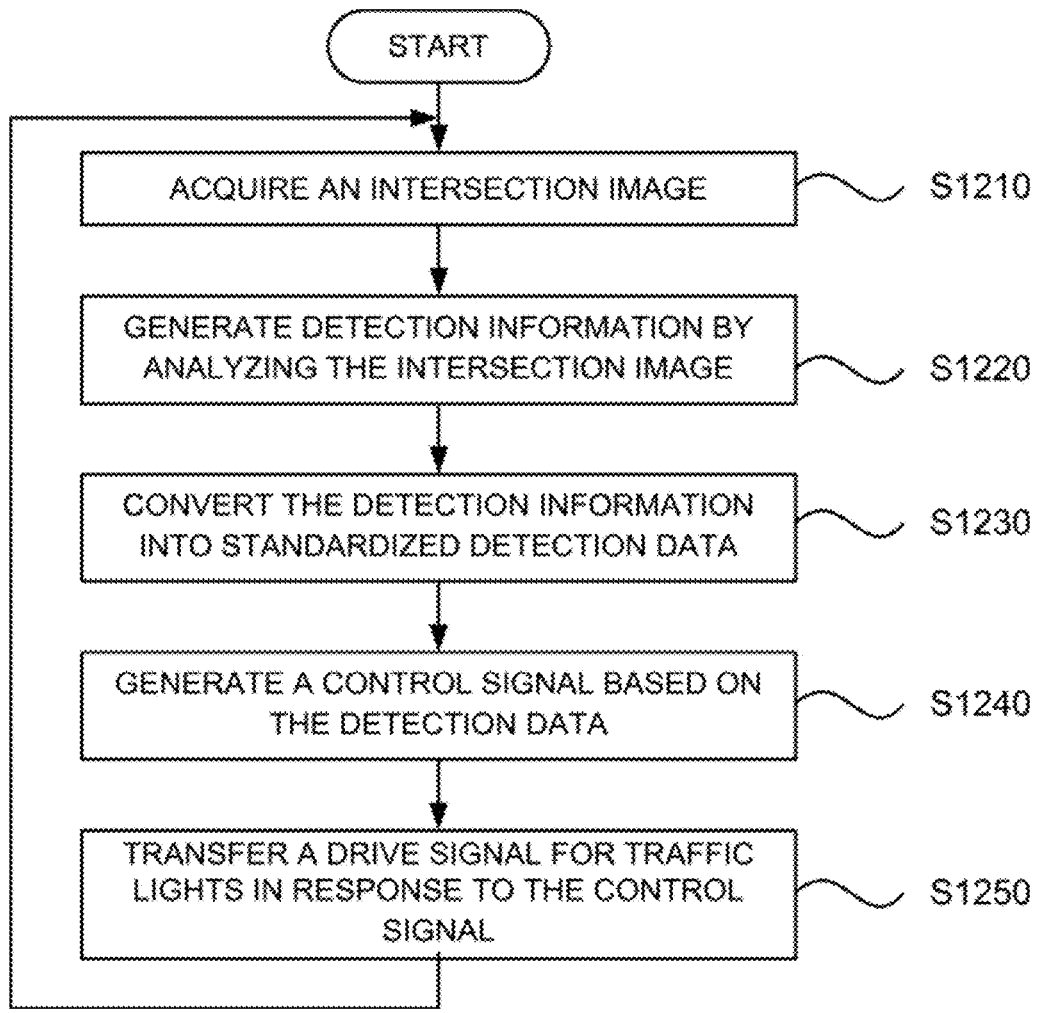

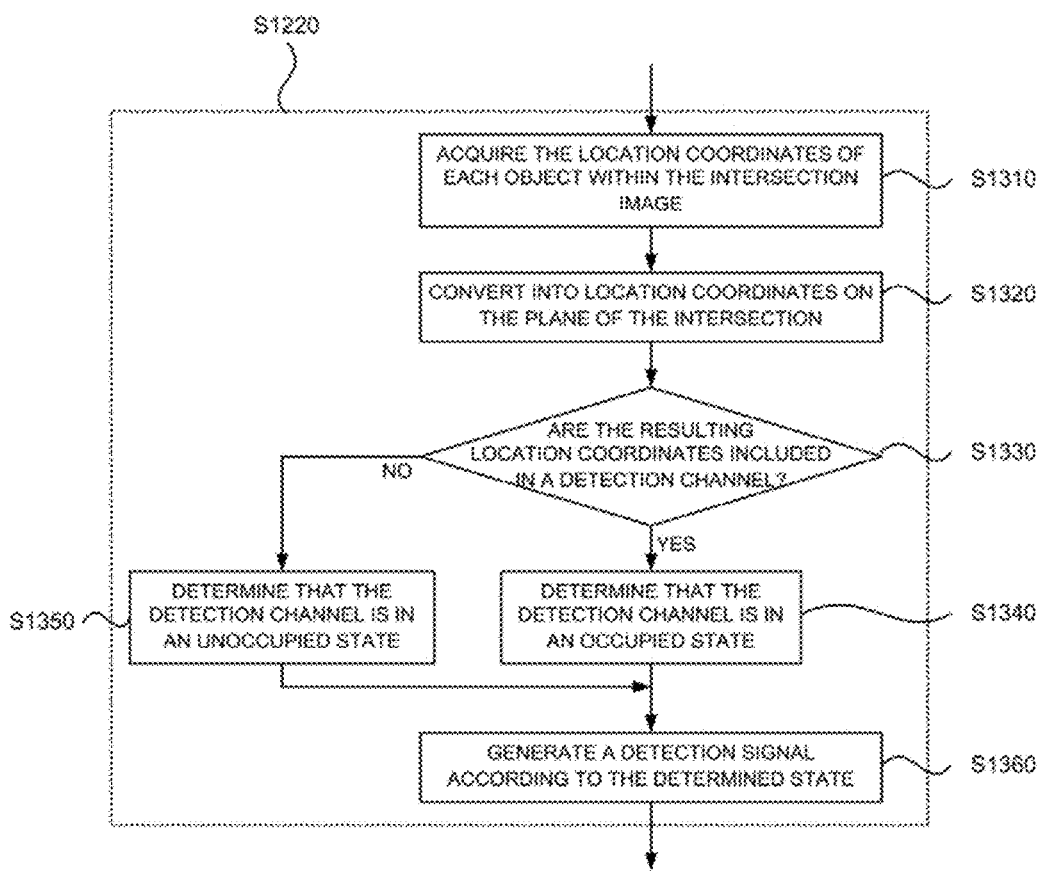

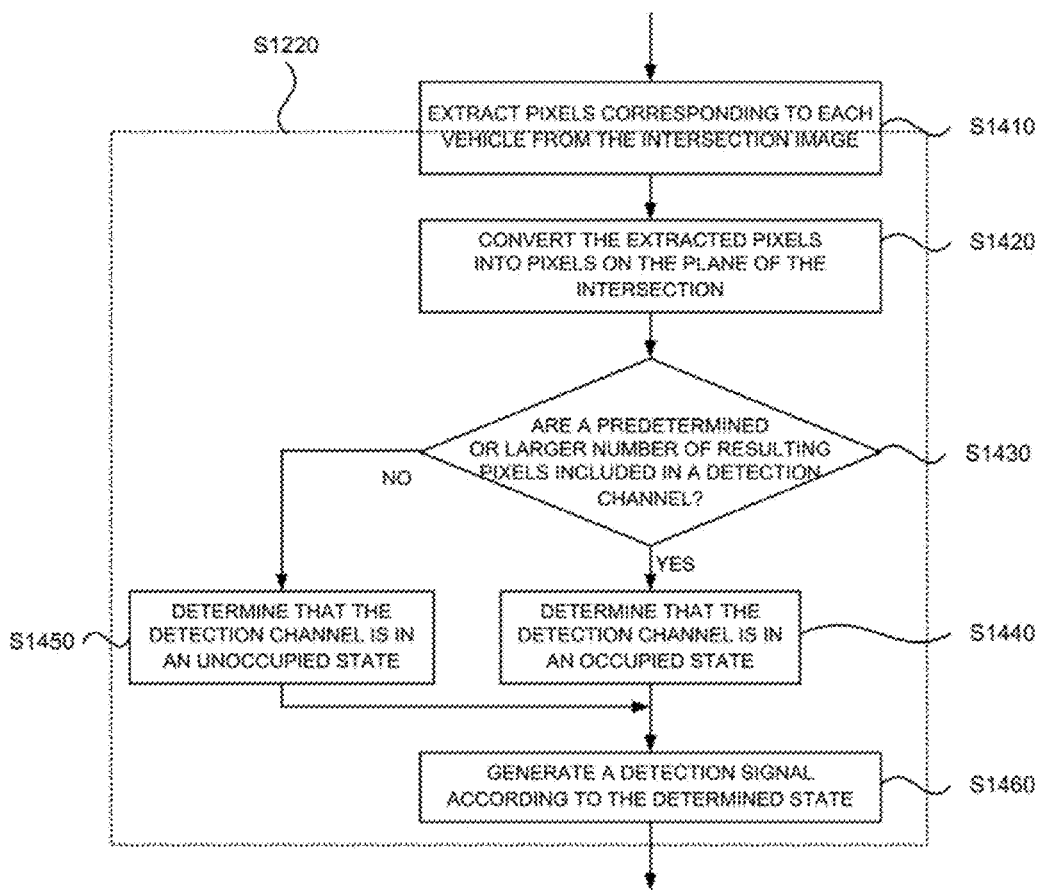

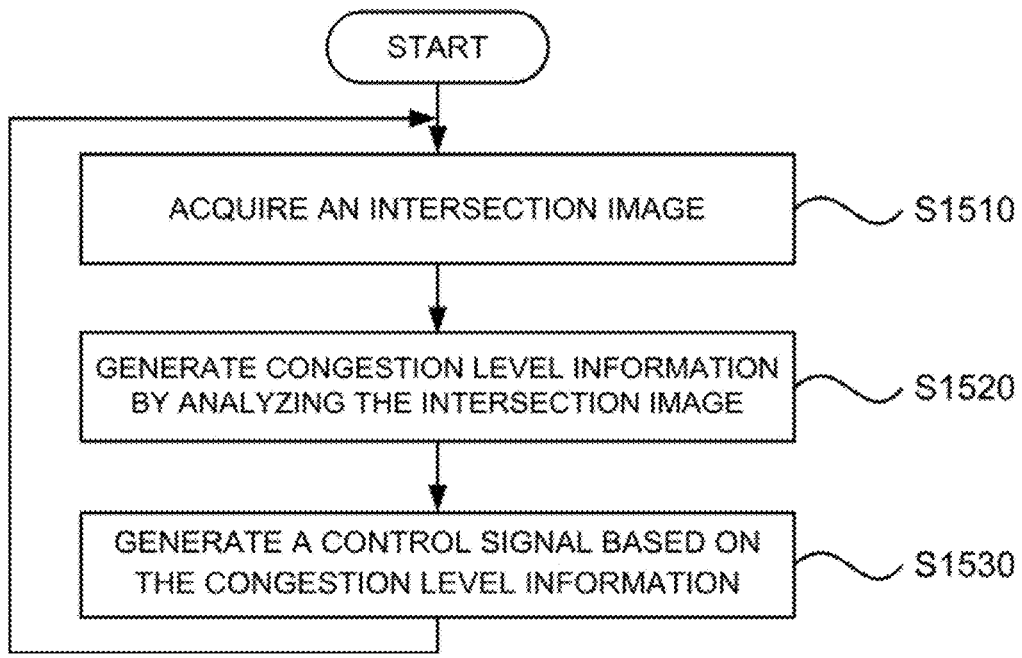

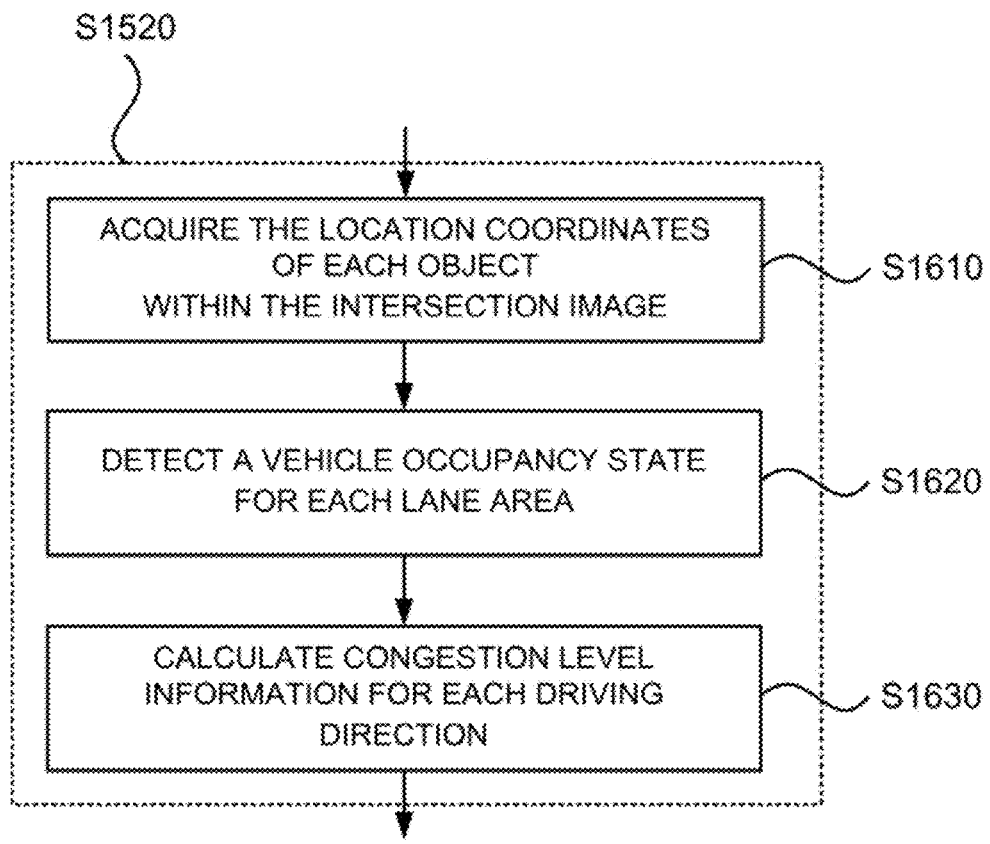

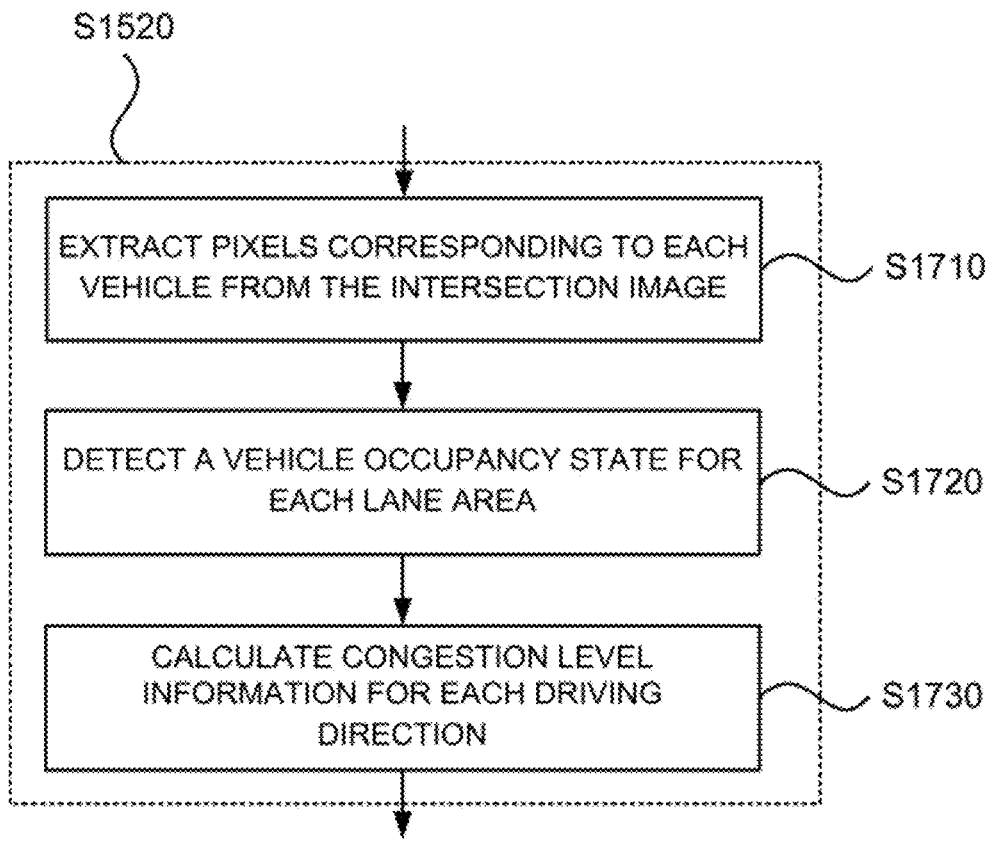

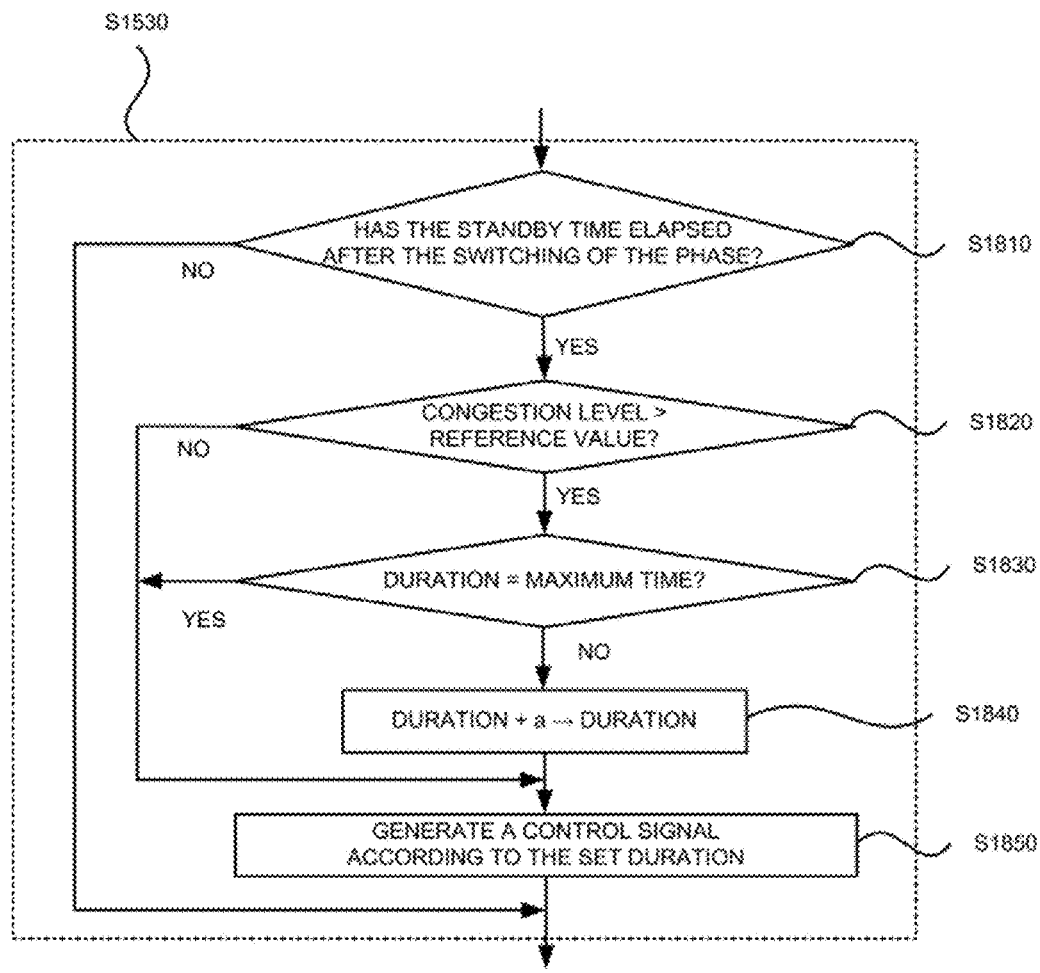
[FIG.18]

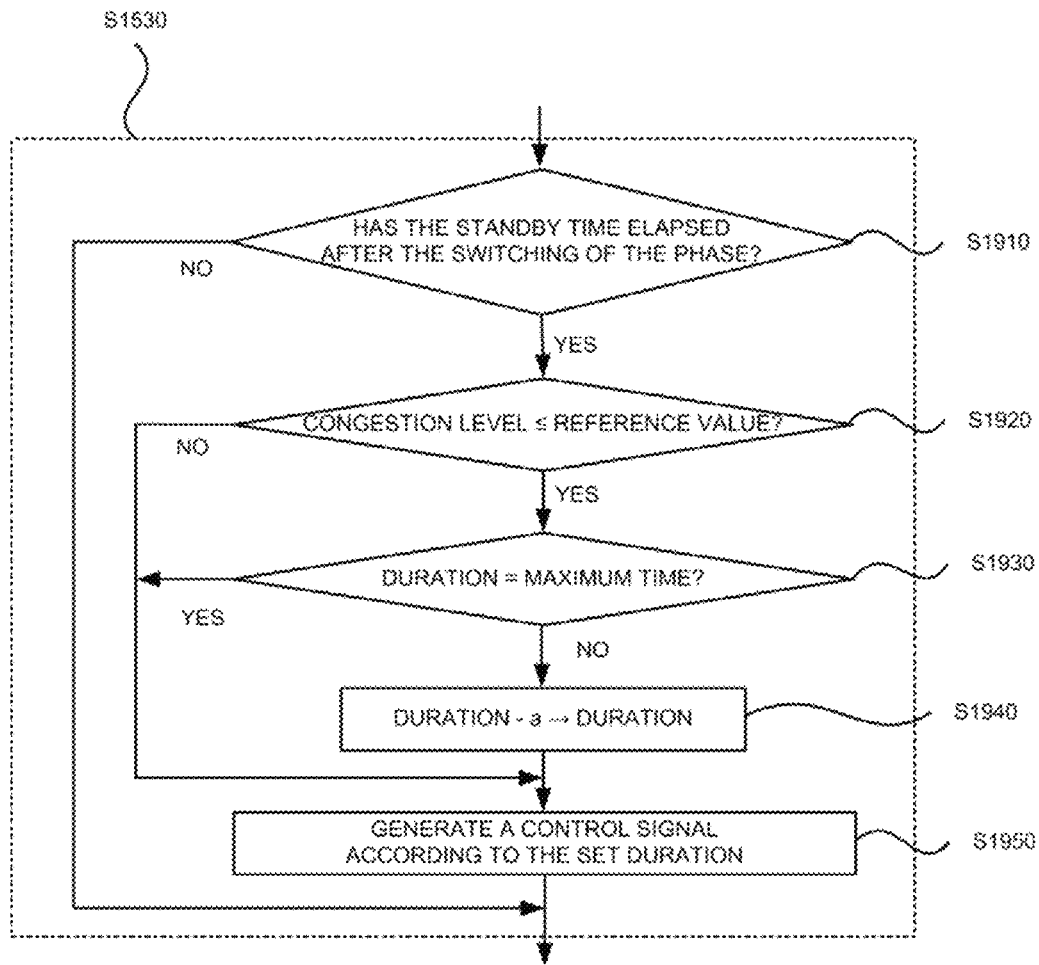
[FIG.19]

IMAGE DETECTION DEVICE, SIGNAL CONTROL SYSTEM COMPROMISING SAME AND SIGNAL CONTROL METHOD

CROSS REFERENCE TO RELATED APPLICATIONS

This application is a National Stage of International Application No. PCT/KR2020/012360 filed Sep. 14, 2020, claiming priority based on Korean Patent Application No. 10-2019-0134923 filed Oct. 28, 2019.

TECHNICAL FIELD

The embodiments disclosed herein relate to an image detection device, a signal control system including the same, and a signal control method, and more particularly to a method and an apparatus.

BACKGROUND ART

Traffic lights are essential to the maintenance of order on roads, but there are many cases where traffic jams are caused by traffic lights. In particular, when the duration of a signal for the movement direction of a heavily congested lane is short, roads for movement in the other directions tend to be also congested.

Accordingly, in recent years, there are an increasing number of intersections at which actuated traffic lights that are controlled using a method of taking into consideration real-time traffic, such as a method of increasing signal duration for a heavily congested direction and reducing signal duration for the remaining directions, are installed.

In order to perform the actuated control of traffic lights in the above-described manner, it is necessary to detect traffic on each road or lane entering an intersection. For this purpose, in the conventional art, it is common to use loop detectors buried in the ground. A loop detector includes a loop coil installed on the surface of a road and configured such that an alternating magnetic field having uniform inductance is formed therein, and detects the presence or speed of a vehicle by detecting a change in inductance caused by a magnetic field induced by a conductor included in the vehicle when the vehicle enters over the coil.

However, such a loop detector is problematic in that it is frequently damaged due to the movement of vehicles because it is buried under a road and in that the durability thereof is not high.

Furthermore, there is a problem in that multiple loop detectors are required in order to install loop detectors at an intersection and control traffic lights according to traffic. Loop detectors must be installed in respective lanes and a loop detector detection method does not cover a wide area due to its characteristics, so that multiple loop detectors must be installed at one intersection. For example, at a four-way intersection, 64 loop detectors are required.

Furthermore, since the loop detector is buried under a road, it is necessary to block vehicles from running on a road and perform construction in order to install a new loop detector or to repair or replace a broken loop detector. In this case, additional congestion is caused due to the blocking of the road, and there are losses of time and money because road pavement construction must be carried out again.

In addition, since the loop detector can recognize only the situation of a local part where the detector is installed and it is difficult to detect the overall situation of a road, there is a problem in that it is difficult to utilize this technology for signal control that is performed while taking into consideration the overall situation of an intersection.

Accordingly, there is an attempt to detect traffic using an image detection device and to control a traffic signal using the detected traffic. Korean Utility Model Registration No. 20-0316081 discloses a CCTV camera that detects traffic by processing a captured image. However, even according to this conventional art, there is a problem in that the image detection device is not compatible with a traffic signal controller used on an actual road, so that it is difficult to use the image detection device for the actuated control or spillback control of traffic lights.

Furthermore, in the conventional art, analysis technology sufficient to understand the overall situation of a road or intersection by analyzing an image captured by the image detection device in real time is not supported, so that the conventional technology cannot be used for traffic signal control.

Therefore, there is a need for a technology for overcoming the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

An object of the embodiments disclosed herein is to propose an image detection device having high durability and low damage possibility and also propose a signal control system including the same and a signal control method.

An object of the embodiments disclosed herein is to propose an image detection device capable of reducing installation cost and time because it has a simple configuration and also propose a signal control system including the same and a signal control method.

An object of the embodiments disclosed herein is to propose an image detection device capable of being installed without separate construction and also propose a signal control system including the same and a signal control method.

An object of the embodiments disclosed herein is to propose an image detection device capable of detecting all the situations of the entry and exit of an intersection and incorporating the results of the detection into traffic signal control and also propose a signal control system including the same and a signal control method.

Moreover, an object of the embodiments disclosed herein is to propose an image detection device conforming to the standard of a conventional police-agency traffic signal controller and also propose a signal control system including the same and a signal control method.

Technical Solution

As a technical solution for accomplishing the above objects, according to an embodiment, there is provided an image detection device for providing detection information to a traffic signal controller, the image detection device including: a photographing unit configured to acquire an intersection image by capturing an image of an intersection; a control unit configured to generate detection information, including information about a vehicle-occupied or -unoccupied state for each of one or more detection channels set on the plane of the intersection by analyzing the intersection image acquired by the photographing unit; and a communication unit configured to transmit the detection information, generated by the control unit, to the traffic signal controller.

According to another embodiment, there is provided a signal control system including an image detection device, the signal control system including: a traffic signal controller configured to receive the detection information from the image detection device, and to generate control information about a signal to be flickered in traffic lights based on the received detection information; and traffic lights configured to be driven under the control of the traffic signal controller.

According to still another embodiment, there is provided a signal control method that is performed by a signal control system including an image detection device and a traffic signal controller, the signal control method including: acquiring an intersection image by capturing an image of an intersection; generating detection information, including information about a vehicle-occupied or -unoccupied state for each of one or more detection channels set on the plane of the intersection by analyzing the intersection image; generating detection data by converting the detection information into 4-bit channel information for each of the detection channels; generating a control signal for the actuated control or spillback control of the intersection based on the detection data; and transferring a drive signal to traffic lights based on the control signal.

According to still another embodiment, there is provided a computer-readable storage medium having stored thereon a program for performing a signal control method, wherein the signal control method includes: acquiring an intersection image by capturing an image of an intersection; generating detection information, including information about a vehicle-occupied or -unoccupied state for each of one or more detection channels set on the plane of the intersection by analyzing the intersection image; generating detection data by converting the detection information into 4-bit channel information for each of the detection channels; generating a control signal for the actuated control or spillback control of the intersection based on the detection data; and transferring a drive signal to traffic lights based on the control signal.

According to a further embodiment, there is provided a computer program that is executed by a signal control system and stored in a medium in order to perform a signal control method, wherein the signal control method includes: acquiring an intersection image by capturing an image of an intersection; generating detection information, including information about a vehicle-occupied or -unoccupied state for each of one or more detection channels set on the plane of the intersection by analyzing the intersection image; generating detection data by converting the detection information into 4-bit channel information for each of the detection channels; generating a control signal for the actuated control or spillback control of the intersection based on the detection data; and transferring a drive signal to traffic lights based on the control signal.

Advantageous Effects

According to any one of the above-described technical solutions, there may be proposed the image detection device and the signal control system including the same and the signal control method.

According to any one of the above-described technical solutions, there may be proposed the image detection device having high durability and low damage possibility and the signal control system including the same and the signal control method.

According to any one of the above-described technical solutions, there may be proposed the image detection device capable of reducing installation cost and time because it has a simple configuration and the signal control system including the same and the signal control method.

According to any one of the above-described technical solutions, there may be proposed the image detection device capable of being installed without separate construction and the signal control system including the same and the signal control method.

According to any one of the above-described technical solutions, there may be proposed the image detection device capable of detecting all the situations of the entry and exit of an intersection and incorporating the results of the detection into traffic signal control and the signal control system including the same and the signal control method.

According to any one of the above-described technical solutions, there may be proposed the image detection device conforming to the standard of a conventional police-agency traffic signal controller and the signal control system including the same and the signal control method.

The effects that can be obtained by the embodiments disclosed herein are not limited to the above-described effects, and other effects that have not been described above will be clearly understood by those having ordinary skill in the art, to which the present invention pertains, from the following description.

DESCRIPTION OF DRAWINGS

FIG. 1 is a block diagram showing an image detection device according to an embodiment;

FIG. 2 is a conceptual diagram showing the schematic configuration of a signal control system including the image detection device according to an embodiment;

FIG. 3 is a block diagram showing the configuration of the signal control system according to the embodiment more specifically;

FIGS. 4 and 5 are exemplary views illustrating detection channel configurations for an image detection device according to one embodiment and another embodiment;

FIG. 6 is a diagram showing the detection data format of a signal control system according to an embodiment;

FIGS. 7 and 8 are exemplary views illustrating detection methods for an image detection apparatus according to one embodiment and another embodiment;

FIG. 9 is an exemplary view of a screen that provides congestion level information calculated by the signal control system including the image detection device;

FIGS. 10 and 11 are exemplary views illustrating a process in which the signal control system controls a traffic signal according to a congestion level;

FIGS. 12 to 14 are flowcharts illustrating a signal control method according to an embodiment in a stepwise manner; and FIGS. 15 to 19 are flowcharts illustrating a signal control method according to another embodiment in a stepwise manner.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

The embodiments will be described in detail below with reference to the accompanying drawings.

FIG. 1 is a block diagram showing the configuration of an image detection device 100 according to an embodiment, FIG. 2 is a conceptual diagram showing the schematic configuration of a signal control system including the image detection device 100 according to an embodiment, and FIG. 3 is a block diagram showing the configuration of the signal control system according to the embodiment more specifically.

The image detection device 100 is a device that is installed at an intersection and captures and analyzes an image such as an image of an entry into the intersection or an image of an exit from the intersection. In the following description, an image captured by the image detection device 100 installed at intersection is referred to as an 'intersection image.'

As shown in FIG. 1, the image detection device 100 includes a photographing unit 110 configured to capture an intersection image, and a control unit 120 configured to analyze the intersection image.

The photographing unit 110 may include a camera configured to capture an intersection image. The photographing unit 110 may include a camera capable of capturing images of wavelengths within a predetermined range, such as that of visible light or infrared light. Accordingly, the photographing unit 110 may acquire an intersection image by capturing an image of a different wavelength region depending on the daytime, the nighttime, or a current situation. In this case, the photographing unit 110 may acquire an intersection image at a preset period.

In addition, the control unit 120 generates 'detection information' to be described later by analyzing an intersection image acquired by the photographing unit 110. In this case, the control unit 120 may process the intersection image to be analyzed, and may identify an object or pixels corresponding to each vehicle in the processed intersection image. Furthermore, for this purpose, the control unit 120 may identify an object corresponding to each vehicle in the intersection image or whether each pixel is a location corresponding to a vehicle by using an artificial neural network.

In this case, the image detection device 100 may be configured as a single hardware device that is not physically separated. However, this is not necessarily the case, but may include two or more hardware devices so that the photographing unit 110 configured to capture an intersection image and the control unit 120 configured to analyze the intersection image captured by the photographing unit 110 communicate with each other and are physically spaced apart from each other. In other words, the image detection device 100 may be configured such that the capturing and analysis of an intersection image are separately performed by hardware devices spaced apart from each other. In this case, the hardware device including the configuration of the control unit 120 may receive intersection images from a plurality of different photographing units 110, respectively, and may analyze the intersection images acquired by the plurality of respective photographing units 110.

Furthermore, the image detection device 100 may include a storage unit 130. The storage unit 130 may store a program, data, a file, an operating system, etc. required for the capturing or analysis of an intersection image, and may at least temporarily store an intersection image or the results of the analysis of an intersection image. The control unit 120 may access and use the data stored in the storage unit 130, or may store new data in the storage unit 130. Furthermore, the control unit 120 may execute a program installed in the storage unit 130.

Furthermore, the image detection device 100 may include a communication unit 140. The communication unit 140 enables the above-described image detection device 100 to perform wired/wireless communication with another device or a network. To this end, the communication unit 140 may include a communication module that supports at least one of various wired and wireless communication methods. For example, the communication module may be implemented in the form of a chipset.

The wireless communication supported by the communication unit 120 may be, for example, Wireless Fidelity (Wi-Fi), Wi-Fi Direct, Bluetooth, Ultra-Wideband (UWB), or Near Field Communication (NFC). In addition, the wired communication supported by the communication unit 120 may be, for example, USB, or High Definition Multimedia Interface (HDMI).

More specifically, the communication unit 140 may serve to transmit the detection information or the intersection image, generated by the image detection device 100, to a traffic signal controller 200 or a central center 300 to be described later. It will be apparent that the communication unit 140 may serve to receive a control signal for the image detection device 100 from the traffic signal controller 200 or the central center 300 in reverse.

As described above, the image detection device 100 is installed at the intersection. Depending on an installation height or location, only one photographing unit 110 is provided at one intersection, or a number of photographing units 110 equal to the number of entries/exits at an intersection may be provided. For example, in the case of a four-way intersection, the image detection device 100 may include four photographing units 110 configured to acquire images of the intersection by capturing four entries/exits separately. It can be seen that compared with the conventional loop detectors, only a significantly small number of hardware components are required.

Meanwhile, the image detection device 100 may form a signal control system together with the traffic signal controller 200 and the central center 300. In this case, the traffic signal controller 200 is a device configured to control the operating status of traffic lights S installed at an intersection, and the central center 300 is a device configured to manage or control a plurality of traffic signal controllers 200 in an integrated manner.

More specifically, the traffic signal controller 200 may be configured to include a main control unit, a signal drive unit, and other device units, as shown in FIG. 3. In this case, the main control unit may be configured such that a power supply device, a main board, an operator input device, a modem, a detector board, and an option board are connected to a single bus. The signal drive unit may be configured to include a controller board, a flasher, a synchronous drive device, and an expansion board. In addition, the other device units configured to control other devices such as an image capturing device configured to detect whether a traffic signal is violated may be provided.

In particular, the main control unit of the traffic signal controller 200 may include at least one option board configured to receive detection information from the image detection device and convert it into detection data including 4-bit channel information for each detection channel, and a main board configured to receive the detection data from the option board and generate a control signal for the actuated control or spillback control of an intersection.

Meanwhile, the signal drive unit of the traffic signal controller 200 may receive a control signal from the main board, may generate a drive signal for traffic lights according to the control signal, and may apply the generated drive signal to the traffic lights.

In addition, the central center 300 may centrally control a plurality of traffic signal controllers 200 at a plurality of intersections so that they can be controlled in association with each other, or may allow each of the traffic signal controllers 200 to be locally controlled according to the situation of a corresponding one of the intersections. The central center 300 may control the situations of the respective intersections for the purpose of reference when selecting an appropriate control method or generating a specific control signal, and may directly receive an intersection image captured by the image detection device 100 or receive detection information or congestion level information generated by the image detection device 100. The congestion level information will be described later.

In addition, the signal control system may further include a hub 400.

When the number of option boards included in the above-described traffic signal controller 200 is insufficient compared to the number of detection channels via which the image detection device 100 detects an occupied or unoccupied state, the hub 400 may be selectively included in the signal control system. Since detection data including channel information corresponding to eight detection channels may be generated by one option board, one option board is required for every eight detection channels. When only four option boards are provided in the traffic signal controller at an intersection for which 64 detection channels are set, hubs 400 corresponding to the four option boards may be further included in the signal control system.

Like the option board, the hub 400 serves to convert the detection information of the image detection device 100 into detection data and transmit it to the main board of the traffic signal controller 200.

The above-described detection channels, detection information, channel information, and detection data will be described later.

The operation of the control unit 120 of the image detection device 100 will be described in more detail below. The control unit 120 may analyze the intersection image acquired by the photographing unit 110, and may generate detection information including information about a vehicle-occupied or -unoccupied state for each of one or more detection channels set on the plane of the intersection.

In this case, the detection channel is a preset area on the plane of an intersection, and the control unit 120 checks whether one or more preset detection channels have been each occupied by a vehicle.

More specifically, the detection channel may be set to a specific area on the plane of an intersection, as shown in FIG. 4 or 5. In this case, FIGS. 4 and 5 are exemplary views illustrating detection channel configurations for an image detection device according to one embodiment and another embodiment. In this case, the plane of the intersection is a virtual surface, and may be a plane set to approximate a three-dimensional surface formed by the actual intersection and the entries and exits of the intersection or be composed of a combination of planes.

As shown in FIG. 4, detection channels are set to specific areas on the plane of an intersection. For example, at an eight-lane four-way intersection, stop line detection channels, standby line detection channels, and spillback detection channels may be included for lanes. In this case, a total of 16 stop line detection channels may be set for respective lanes at locations adjacent to locations corresponding to the actual stop lines of entry roads. Furthermore, a total of 16 standby line detection channels may be set for respective lanes at locations spaced apart backward from the locations of the actual stop lines of the entry roads by a predetermined distance. In addition, a total of 32 spillback detection channels may be set for exit roads, two for each lane.

The locations of these detection channels on the plane of the intersection may be stored in advance in the above-described storage unit 130. In addition, the information about detection channels may be set differently for each image detection device 100 installed at each intersection by incorporating the characteristics of each intersection thereinto.

As another embodiment, as shown in FIG. 5, there may be set a total of 16 stop line detection channels for respective lanes at locations adjacent to the locations corresponding to the stop lines of respective entry roads, four integrated standby line detection channels for the respective roads at locations spaced apart backward from the stop lines by a certain distance, and four integrated spillback detection channels for respective exit roads. Furthermore, four dilemma zone detection channels may be additionally set for respective roads between the stop line detection channels and the standby line detection channels.

In this case, the image detection device 100 determines the state of an intersection by analyzing an intersection image acquired through the photographing unit 110. Accordingly, this case may determine the current state of the intersection using one integrated channel for individual lanes or each road, unlike the case of determining the state of an intersection using the conventional loop detectors. For this reason, the number of detection channels may be reduced, and hardware resources that may be additionally required due to the number of detection channels may be saved.

However, the control unit 120 does not analyze an occupied or unoccupied state using only the embodiments of the detection channels described with reference to FIGS. 4 and 5, but the locations or sizes of detection channels may be appropriately changed. For example, in addition to those illustrated in the drawings, a method of operating stop line detection channels in such a manner as to divide each stop line detection channel into two detection channels for through movement and turning left, respectively, or a method of selectively operating standby line detection channels or spillback detection channels as one to four channels may be additionally taken into consideration.

Furthermore, the control unit 120 constructs detection information to generate detection data having a data format such as that shown in FIG. 6. FIG. 6 is a diagram showing the detection data format of a signal control system according to an embodiment. In this case, the detection information includes information indicating a vehicle-occupied or -unoccupied state for each detection channel, as described above.

Referring to FIG. 6, the detection data used in the traffic signal controller 200 to be described later includes channel information for four detection channels or eight detection channels. The channel information for each detection channel has a total of 4 bits of data including 1 bit indicating a vehicle-occupied or -unoccupied state for the detection channel. In this case, the remaining 3 bits of data may include information indicating the state of the detection device, for example, information about whether a disconnection, a short circuit, a bad oscillation, or the like has occurred. Accordingly, the control unit 120 may include information indicating the state of the image detection device 100 in the detection information. However, this is not necessarily the case, and the control unit 120 of the image detection apparatus 100 having a low defect rate and desirable durability compared to the loop detector may not include information, corresponding to the remaining 3 bits of the channel information included in the detection data, in the detection information. In particular, when the conventional loop detectors are used, pieces of detection information of respective detection channels are generated by different loop detectors. Accordingly, it is necessary to separately include information about the state of the loop detector in information for each channel. In contrast, when the image detection device 100 is used, pieces of detection information for different detection channels are acquired by the same single image detection device 100 or the photographing unit 110, and thus the need to write the remaining 3 bits of each piece of channel information is low. Accordingly, the control unit 120 may not include information about the state of the image detection device 100 in a separate piece of detection information for each detection channel.

Furthermore, the image detection device 100 separates detection channels and determines the occupancy states thereof, as described above, and then generates pieces of detection information corresponding thereto. Accordingly, the traffic signal controller 200 that has received detection information from the conventional loop detectors and has been operated based on the detection information may be used without special modification or change.

In this case, a process in which the control unit 120 of the image detection device 100 generates detection information for each detection channel will be described with reference to FIGS. 7 and 8. FIGS. 7 and 8 are exemplary views illustrating detection methods for an image detection apparatus according to one embodiment and another embodiment. In an embodiment, the control unit 120 may acquire the coordinates of the location of each object in an intersection image by using an artificial neural network that recognizes an object included in the intersection image and estimated to be a vehicle by using the intersection image as an input and outputs information about the location of the recognized object. Then, the control unit 120 may convert the acquired coordinates of the location of the object in the intersection image into the coordinates of a location on the plane of the intersection, and may determine that a corresponding detection channel is occupied when the resulting coordinates of the location are included in the detection channel.

More specifically, referring to FIG. 7, settings may be made such that the input value of the artificial neural network used by the control unit 120 is an intersection image I and the output value thereof includes the location information of an object O estimated to be a vehicle and the size information of the object. In this case, the location information of the object is the coordinates (x, y) of the center point P of the object, the size information is information about the width and height (w, h) of the object, and the output value of the artificial neural network may be calculated in the form of (x, y, w, h) for the object O. The control unit 120 may extract detection information including information about a vehicle-occupied or -unoccupied state for each detection channel from the output value. In other words, after acquiring the coordinates (x, y) of the center point P of each vehicle image as two-dimensional coordinates from the output value of the artificial neural network, the two-dimensional coordinates on a plane PI formed by the intersection image may be corrected by being mapped to an intersection plane PR. Accordingly, when the corrected center point of the object O is located within the area of the preset detection channel, bit information corresponding to 'occupied' may be transmitted. In contrast, when the corrected center point P of the object O is not located in the area corresponding to the preset detection channel, bit information corresponding to 'unoccupied' may be transmitted.

In this case, an available artificial neural network may be, for example, YOLO, SSD, Faster R-CNN, Pelee, or the like, and such an artificial neural network may be trained to recognize an object corresponding to a vehicle in an intersection image.

Furthermore, as another example, the control unit 120 may acquire detection information about a vehicle-occupied or unoccupied state by using an artificial neural network that performs segmentation analysis. The control unit 120 may extract pixels corresponding to a vehicle by using an artificial neural network that receives an intersection image as an input and outputs a probability map indicating a probability that each pixel included in the intersection image corresponds to a vehicle, may convert the extracted pixels into pixels on the plane of an intersection, and may determine a vehicle-occupied or -unoccupied state for each detection channel according to the number of resulting pixels included in the detection channel.

A detailed description will be given with reference to FIG. 8. The input value of the artificial neural network used by the control unit 120 may be an intersection image I, and the output value may be a map of the probability that each pixel corresponds to a vehicle. In addition, the control unit 120 may extract pixels constituting an object O corresponding to a vehicle based on the map of the probability that each pixel corresponds to a vehicle, which is the output value of the artificial neural network. Accordingly, as shown in the drawing, only the pixels of a portion corresponding to the object O in the intersection image I are extracted separately from other pixels, and the control unit 120 may map each of the former pixels to the intersection plane PR. Thereafter, the control unit 120 transmits bit information indicating 'occupied' when the number of pixels mapped within the area of a preset detection channel is equal to or larger than a predetermined number, and may transmit bit information indicating a 'unoccupied' state when the number of pixels recognized as corresponding to the vehicle within the area of the preset detection channel is smaller than or equal to the predetermined number.

In this case, an available artificial neural network may be, for example, FCN, Deconvolutional Network, Dilated Convolution, DeepLab, or the like. Such an artificial neural network may be trained to generate a probability map by calculating a probability that each pixel included in an intersection image corresponds to a specific object, particularly a vehicle.

Meanwhile, when the image detection device 100 generates detection information including information about an occupied or unoccupied state for each detection channel as described above, the option board of the traffic signal controller 200 or the hub 400 may generate detection data to be transmitted to the main board of the traffic signal controller 200 by using the detection information. In this case, the detection data may have the data format shown in FIG. 6 as described above.

Accordingly, the detection data includes the pieces of channel information of detection channels corresponding to 4 or 8, and has 4 bits of data for each piece of channel information. In this case, the option board or the hub 400 may write bit information indicating an occupied or unoccupied state included in the detection information as '0' or '1' in the first bit of each piece of channel information. Although the value '0' indicating that all are normal may be written in the remaining 3 bits, information indicating the state of the image detection device 100 may be written therein according to an embodiment.

Furthermore, when the period at which the detection information is received from the image detection device 100 corresponds to an integer multiple of the period at which the detection data is transferred to the main board, the option board or the hub 400 may generate detection data by duplicating the detection information a number of times equal to the integer multiple or may generate detection data by duplicating the detection data, generated by the detection information, the number of times equal to the integer multiple. For example, when the image detection device 100 transmits the detection information at a period of 100 msec and the main board receives the detection data at a period of 20 msec, the option board may additionally generate the detection data, generated by using the detection information received from the image detection device 100, four times and may transmit the same detection data to the main board a total of five times at a period of 20 msec.

In this case, the main board of the traffic signal controller 200 may perform actuated control and spillback control as the local control of an independent intersection. In this case, the actuated control may be gap-time actuation, loss-time actuation, or saturated-flowrate actuation.

The gap-time actuation is a control method that reduces time consumption in such a manner as to terminate a current phase early and allowing a signal pattern corresponding to a subsequent phase to be output when, in the case where vehicles successively move along one detection channel, the unoccupied time that appears between the two vehicles is equal to or longer than a set threshold unoccupied time.

The loss-time actuation is a control method that reduces time consumption in such a manner as to accumulate the unoccupied time for which one detection channel is not occupied by each passing vehicle and terminate a current phase early and proceed to a subsequent phase when the cumulative unoccupied time is equal to or longer than a set threshold loss time.

Furthermore, the saturated-flowrate actuation is a control method that maximizes the efficiency of an intersection by terminating green light time early at the point at which the outflow traffic in the second half of the green light time becomes maximum upon being oversaturated.

In addition, the spillback control may include spillback early termination control and spillback equity offset control.

The spillback early termination control is a control method that blocks the advancement of vehicles in a direction in which spillback has occurred by terminating a green phase early when the occupancy of a spillback detection channel is continuously detected.

In addition, the spillback equity offset control is a control method that terminates a signal at a point at which a vehicle advances in a direction in which spillback occurs by applying an equity offset when there is a risk of spillback and starts a signal for a crossing direction.

In this case, the phase is a signal pattern presented by the traffic lights S. For example, the phase refers to a combination of signals that appear simultaneously at traffic lights in east, west, north, and south directions. In general, a setting is made such that different phases appear sequentially.

Thereafter, the main board of the traffic signal controller 200 performs an operation corresponding to the above-described actuated control or spillback control method by using the detection data received from the option board or the hub 400, thereby generating a control signal adapted to control the traffic lights S.

In addition, the signal drive unit of the traffic signal controller 200 performs signal control by applying a drive signal, generated according to a control signal, to the traffic lights S.

Meanwhile, as another embodiment, the image detection device 100, the traffic signal controller 200, or the central center 300 of the signal control system may calculate congestion level information by analyzing an image of an intersection captured and acquired by the image detection device 100, and may use the congestion level information for signal control.

In this case, when the traffic signal controller 200 or the central center 300 calculates the congestion level information, it may calculate the congestion level information by receiving and analyzing an intersection image acquired by the image detection device 100.

Although an example in which the control unit 120 of the image detection device 100 calculates congestion level information will be described as an example below, the traffic signal controller 200 or the central center 300 may calculate the congestion level information as described above. When the traffic signal controller 200 calculates a congestion level, any configuration including a calculation means such as a main board or option board included in the main control unit of the traffic signal controller 200, the other device units, or the signal drive unit may be used to calculate the congestion level.

In this case, the 'congestion level information' is information expressed by digitizing the degree of congestion for each driving direction, and may be calculated for each driving direction. For example, the congestion level may be represented by a numerical value having a value in the range of 0 to 100, with 0 set to a case where a road having a specific driving direction is not occupied and 100 set to a case where a road having a specific driving direction is in a saturated state.

The control unit 120 may detect a vehicle-occupancy state for each lane area by analyzing an intersection image, and may calculate congestion level information for each driving direction based on the detected occupancy state. Furthermore, the congestion level calculated by the control unit 120 may be transferred to the traffic signal controller 200 or the central center 300 through the communication unit 140.

In this case, the control unit 120 may acquire the location coordinates of each object using an artificial neural network that receives an intersection image as an input, recognizes an object included in the intersection image and estimated to be a vehicle, and outputs information on the location of the recognized object, and may detect a vehicle-occupancy state for each lane area according to the distribution of the acquired location coordinates of objects, thereby calculating congestion level information for each driving direction.

In this case, the control unit 120 may use preset information about a lane area. Such a lane area may be recognized in the intersection image, or may be preset to a specific area in the intersection image when the photographing angle of the photographing unit 110 does not change.

As described above, the control unit 120 may acquire the location coordinates of each object estimated to be a vehicle using the artificial neural network, and may determine the distribution of objects for each lane area. In this case, the control unit 120 may use a network that is the same as the artificial neural network used in the embodiment described with reference to FIG. 7.

In addition, the control unit 120 may calculate congestion level information for each driving direction according to the distribution of objects for each lane area. For example, at an intersection in which a first lane is a left-turn lane and second to third lanes are through lanes, through direction congestion level information may be calculated based on the distribution of objects in lane areas corresponding to the second and third lanes.

For example, the control unit 120 may set the stepwise ranges of the numbers of objects present in a lane area in a specific direction, and may calculate the congestion level accordingly. The congestion level may be determined according to a preset range to which the number of distributed objects belongs, for example, in such a manner that the congestion level is determined to be 0 when three or fewer objects are distributed in the lane area of a left-turn lane, the congestion level is determined to be 20 when four to six objects are distributed in the lane area of a left-turn lane, the congestion level is determined to be 40 when seven or nine objects are distributed in the lane area of a left-turn lane, and so forth.

Furthermore, when calculating the congestion level, the control unit 120 may take into consideration a phase, or may refer to the results of the analysis of an intersection image in a previously acquired frame or a previously calculated congestion level. For example, when the congestion level is equal to or higher than a predetermined level for a predetermined time or longer, the control unit 120 may calculate the congestion level to be higher than that calculated when the congestion level is not the case even in the case where the numbers of objects recognized within a lane area in a specific direction are the same.

In this case, the control unit 120 may track the movement of the location coordinates of an object recognized as being identical by analyzing successively acquired intersection images. In addition, when the movement distance tracked for a predetermined time is shorter than a predetermined distance, the congestion level of a lane area in which the location coordinates of the corresponding object are distributed may be increased. In this case, the control unit 120 may or may not refer to the movement speed of the location coordinates of the object in the calculation of the congestion level by referring to whether the exit direction of the corresponding lane area is in a green or red phase.

Furthermore, as another method, the control unit 120 may extract pixels corresponding to each vehicle using an artificial neural network that receives an intersection image as an input and outputs a probability map indicating the probability that each pixel included in the intersection image corresponds to a vehicle, and may detect a vehicle-occupancy state for each lane area according to the distribution of extracted pixels, thereby calculating congestion level information for each driving direction.

The artificial neural network used herein may be the same as the artificial neural network used in the embodiment described with reference to FIG. 8. They are only different in that when calculating a congestion level, the distribution of pixels is analyzed for each lane area other than a detection channel, and analysis is completed within an intersection image without matching pixels onto the plane of an intersection.

Meanwhile, in an embodiment in which congestion information is calculated by analyzing the distribution of pixels, the control unit 120 may divide an intersection image by lines parallel to a center line. In other words, the control unit 120 may divide the intersection image into a plurality of rows by dividing it in a vertical direction, and, when one pixel group formed by adjacent pixels among pixels distributed within a lane area is not distributed over a preset or larger number of rows, may determine pixels included in the corresponding pixel group to be erroneously detected pixels and exclude them from analysis.

Meanwhile, the control unit 120 may detect a vehicle-occupancy state for one or more entry direction lane areas, and may calculate congestion information for each driving direction according to a previously classified driving direction for each of the entry direction lane areas. In other words, the congestion level information may be calculated by analyzing a lane area in a direction of entry into the intersection.

Furthermore, the control unit 120 may determine whether spillback occurs by detecting a vehicle-occupancy state for a lane area in an exit direction.

The congestion level information calculated as described above may be displayed as shown in FIG. 9. FIG. 9 is an exemplary view of a screen that provides congestion level information calculated by the signal control system including the image detection device.

In this case, the analyzed congestion information may be transmitted to a manager terminal (not shown) of the central center 300, and may be provided as a screen having a user interface such as that shown in the center of FIG. 9. According to this, an intersection image captured by the image detection device 100 may be displayed on one side of a screen, and each separate lane area and each separate area occupied by a vehicle may be displayed in layers of different colors on the intersection image.

In addition, according to the distribution of areas occupied by vehicles in each lane area, congestion levels in the through and left-turn directions of an entry road and an exit road may be digitized and then displayed on one side of the screen. In this case, the congestion level information may be provided, with a case where the congestion level is high being visually differentiated by a red color and a case where the congestion level is low being differentiated by a green color, so that the congestion level can be intuitively identified. In addition, information on a traffic phase is provided such that a situation at the intersection can be understood in connection with the traffic phase.

The congestion level information calculated by the image detection device 100, the traffic signal controller 200, or the central center 300 as described above may be controlled by the central center 300.

Meanwhile, when at least one of the image detection device 100, the traffic signal controller 200, and the central center 300 calculates the congestion level information as described above, the traffic signal controller 200 or the central center 300 may generate a control signal adapted to give a preferential signal to a driving direction having a high congestion level by referring to the calculated congestion level information.

In other words, the traffic signal controller 200 or the central center 300 may adjust the order or durations of phases in such a manner as to advance the sequential position of a traffic signal adapted to allow driving in a driving direction having a high congestion level or to extend the time allocated to a traffic signal adapted to allow driving in a driving direction having a high congestion level.

In this case, the traffic signal controller 200 may perform phase control while considering a congestion level under local control, and the central center 300 may perform phase control while considering a congestion level under central control.

Furthermore, the traffic signal controller 200 or the central center 300 may generate a control signal adapted to switch a signal from a traffic signal in an entry direction lane corresponding to an exit direction lane area determined to have spillback to an entry prohibition signal. In other words, a signal is preferentially given to a congested entry direction lane, in which case a signal may be switched from an entry direction signal in a green phase corresponding to an exit direction lane in which spillback has occurred to an entry prohibition signal, i.e., a red phase.

Meanwhile, the traffic signal controller 200 or the central center 300 maintains a signal pattern currently output for a preset duration from the start time of a traffic phase. When the congestion level of an entry corresponding to a driving direction in which driving is permitted by a traffic phase is not changed to a predetermined level or lower, the congestion level may be mitigated by adding a predetermined period of time to the duration. It is obvious that in this case, the traffic signal controller 200 or the central center 300 does not add the additional period of time any more when the current actual duration is set to a preset maximum time by repeating the control of adding the predetermined period of time to the duration.

Meanwhile, the traffic signal controller 200 or the central center 300 maintains a signal pattern for a preset duration from the start time of a traffic phase. In this case, when the congestion level of an entry corresponding to a driving direction in which driving is permitted by a traffic phase is changed to a predetermined level or lower, the traffic phase may be rapidly switched to a subsequent signal pattern by subtracting a predetermined period of time from the duration. Even in this case, a minimum period of time may be set such that the duration of the phase is not reduced to an initially set minimum period of time or shorter.

Furthermore, after a preset waiting time has been maintained from the start of a traffic phase up to the performance of control according to a congestion level, the addition or subtraction of a predetermined time may be performed according to the congestion level. In this case, it is obvious that the predetermined period of time to be added or subtracted may be set to different unit period of time in the cases of addition and subtraction, respectively, and the waiting period of time, the maximum period of time, and the minimum period of time may also be set differently for each traffic phase.

FIGS. 10 and 11 are exemplary diagrams illustrating a process in which the signal control system controls a traffic signal according to a congestion level. As shown in FIG. 10, when an entry road is congested at a current point in time when the waiting time has elapsed, i.e., a congestion level is equal to or higher than a predetermined level, the traffic signal controller 200 or the central center 300 may generate a control signal adapted to add a predetermined period of time 'a' to the initially set duration of a traffic phase. Thereafter, when the congestion level is not mitigated even after the elapse of time, the predetermined period of time a may be additionally given.

However, even when the congestion level is not mitigated, the traffic signal controller 200 or the central center 300 may switch a traffic phase to a subsequent signal pattern without giving an additional period of time when the duration of the traffic phase reaches a preset maximum period of time.

Meanwhile, as shown in FIG. 11, the traffic signal controller 200 or the central center 300 may adjust the duration of a traffic phase to a period shorter than an initially set duration when it is determined that the congestion level of an entry road in a green phase is lower than a predetermined level. However, even in this case, it may be possible to determine whether to reduce the duration by monitoring the congestion level after the initially set waiting time has elapsed.

A signal control method that is performed by some of the components included in the above-described signal control system or by all of them in cooperation with each other will be described. The signal control method to be described below includes steps that are performed in a time-series manner in the signal control system including the image detection device 100, the traffic signal controller 200, the central center 300, and the hub 400 described with reference to FIGS. 1 to 11. Accordingly, the descriptions that are omitted below but are given above with reference to FIGS. 1 to 11 may also be applied to signal control methods according to the embodiments shown in FIGS. 12 to 19.

FIGS. 12 to 14 are flowcharts illustrating a signal control method according to an embodiment in a stepwise manner, and FIGS. 15 to 19 are flowcharts illustrating a signal control method according to another embodiment in a stepwise manner.

First, the signal control system acquires an intersection image captured by the image detection device 100 at step S1210.

Then, the signal control system generates detection information by analyzing the intersection image at step S1220. In this case, the detection information includes information indicating whether a detection channel preset on the plane of an intersection is occupied or unoccupied by a vehicle. In this case, the reason why the detection information is calculated as the information indicating whether the detection channel preset on the plane of the intersection is occupied or unoccupied by a vehicle is to utilize the operation method of the traffic signal controller 200, in which the traffic signal controller 200 has received a signal from the conventional loop detector buried and installed in an actual road and has been operated based on the signal, without modifying the operation method.

More specifically, step S1220 may start with step S1310 at which the signal control system acquires the location coordinates of each object in the intersection image, as shown in FIG. 13. In this case, the signal control system may acquire the location coordinates of each object included in the intersection image by using an artificial neural network that receives an intersection image as an input value and outputs information about the location of an object determined to correspond to a vehicle and additionally information about the size thereof.

In addition, the signal control system converts the location coordinates of the object into location coordinates on the plane of the intersection at step S1320.

The signal control system may determine whether the resulting location coordinates are included in a detection channel at step S1330. Then, the signal control system may determine that the corresponding detection channel is in an occupied state when the resulting location coordinates are included in the detection channel at step S1340, and may determine that the corresponding detection channel is in an unoccupied state when the resulting location coordinates are not included in the detection channel, i.e., when the location coordinates of the object are not included in the detection channel, at step S1350.

The signal control system may generate a detection signal according to the occupancy state determined for each detection channel at step S1360.

Furthermore, as another embodiment of step S1220, referring to FIG. 14, the signal control system may extract pixels corresponding to each vehicle from the intersection image at step S1410. In this case, the signal control system may extract pixels corresponding to each vehicle by using an artificial neural network that receives an intersection image as an input and outputs a probability map indicating a probability that each pixel of the intersection image is a pixel at a location corresponding to a vehicle. In other words, the signal control system may extract only pixels whose probability that a corresponding pixel corresponds to a vehicle is equal to or larger than a predetermined value from the probability map.

In addition, the signal control system may convert the extracted pixels into pixels on the plane of the intersection at step S1420. In other words, the coordinates of the pixels may be mapped onto the plane of the intersection.

The signal control system may determine whether the number of resulting pixels included in the detection channel is equal to or larger than a preset number at step S1430. Then, the signal control system may determine that the corresponding detection channel is in an occupied state when the number of resulting pixels included in the detection channel is equal to or larger than the preset number at step S1440, and may determine that the detection channel is in an unoccupied state when the number of resulting pixels included in the detection channel is smaller than the preset number at step S1450.

Thereafter, the signal control system may generate a detection signal according to the occupancy state determined for each detection channel at step S1460.

Thereafter, referring to FIG. 12 again, the signal control system converts the detection information into standardized detection data at step S1230. In this case, the standardized detection data refers to data having a standard corresponding to the detection data format of the conventional loop detector. Accordingly, a 4-bit channel information region may be allocated for each detection channel. In addition, the detection data may be generated in accordance with the period at which the main board of the traffic signal controller 100 receives data.

In addition, the signal control system generates a control signal for the traffic lights S based on the detection data S1240. In this case, when generating a control signal, the signal control system may perform actuated control or spillback control with reference to the detection data, and may use an operation program preset in accordance with each control method.

Thereafter, the signal control system transmits a drive signal to the traffic lights S in response to the control signal at step S1250, and may repeat the above-described process.

Meanwhile, an embodiment in which at least some components of the signal control system calculates a congestion level at an intersection and controls a traffic signal is now be described. As shown in FIG. 15, the signal control system acquires an intersection image at step S1510. The intersection image may be acquired in such a manner that the image detection device 100 captures the intersection image.

In addition, the signal control system generates congestion level information by analyzing the intersection image at step S1520. In this case, the process of generating congestion level information is not described in greater detail. As shown in FIG. 16, the signal control system performs step S1610 of acquiring the location coordinates of each object within the intersection image.

In this case, the signal control system may acquire the location coordinates of each object included in the intersection image by using an artificial neural network that receives an intersection image as an input value and outputs the location of an object, included in the intersection image and estimated to be a vehicle, and selective information about the size thereof as coordinate values.

In addition, the signal control system may detect a vehicle-occupancy state for each lane area according to the distribution of obtained location coordinates of objects in each lane area at step S1620. In this embodiment, the occupancy state may be calculated as an index indicating the saturation level of each lane area attributable to objects distributed within the lane area, such as the number of objects distributed in the lane area, or the ratio of the areas occupied by objects to the area of the lane area, rather than being simply classified as an occupied or non-occupied state.

In addition, the signal control system may calculate congestion level information for each driving direction according to the detected occupancy state for each lane area at step S1630. The signal control system may identify one or more lane areas for each driving direction corresponding to each lane region as a group belonging to the same driving direction, and may then calculate congestion level information for each driving direction.

Meanwhile, another embodiment of the performance of step S1520 is now described. As shown in FIG. 17, the signal control system may extract pixels corresponding to each vehicle from the intersection image at step S1710. In this case, the signal control system may perform step S1710 using an artificial neural network that receives an intersection image as an input value and outputs a probability map indicating a probability that each pixel in the intersection image corresponds to a vehicle.

Accordingly, the signal control system may extract only pixels whose probability that a corresponding pixel corresponds to a vehicle is equal to or larger than a predetermined value.

In addition, the signal control system may detect a vehicle occupancy state for each lane area according to the distribution of acquired location coordinates of objects in each lane area at step S1720. Even in this embodiment, the occupancy state may be calculated by referring to the ratio of the occupancy of extracted pixels in a lane area rather than being simply classified as an occupied or unoccupied state.

In addition, the signal control system may calculate congestion level information for each driving direction based on the vehicle occupancy state for each lane area at step S1730.

However, although a vehicle occupancy state has been described as being detected for each lane area in the embodiments described above, it is obvious that two or more lane areas may be grouped for each driving direction, an occupancy state may be detected for the corresponding areas, and then congestion level information may be calculated in another embodiment.

Referring to FIG. 15 again, the signal control system generates a control signal using the congestion level information calculated according to the embodiment shown in FIG. 16 or 17 at step S1530.

At step S1530, the signal control system may generate a control signal adapted to preferentially give a green phase to a driving direction having a high congestion level, or may generate a control signal adapted to immediately switch a traffic phase to a red phase for a driving direction to an exit when the congestion level of the corresponding exit is high.

Furthermore, at step S1530, when it is determined at step S1810 that a set waiting time has elapsed after the switching of a traffic phase, the signal control system may monitor the congestion level of an entry in a driving direction in a green phase by comparing it with a reference value at step S1820, as shown in FIG. 18. Accordingly, when the congestion level of the entry is equal to or higher than the reference value, the signal control system may check whether the currently set duration has reached the maximum time at step S1830, and may increase the duration by adding a predetermined period of time 'a' when the currently set duration does not reach the maximum time at step S1840.

Thereafter, the signal control system may generate a control signal according to the set duration at step S1850.

Meanwhile, when it is determined that the waiting time has not elapsed at step S1810 or it is determined that the congestion level is lower than a reference value at step S1820, the currently set duration may be maintained and the process may be returned to initial step S1510.

In another embodiment, at step S1530, when the waiting time has elapsed after the switching of the traffic phase at step S1910, the signal control system may monitor the congestion level of an entry in a driving direction in a green phase by comparing it with a reference value at step S1920, as shown in FIG. 19. Accordingly, when the congestion level of the entry is lower than the reference value, the signal control system checks whether the currently set duration has reached the minimum time at step S1930, and may reduce the duration by subtracting a predetermined period of time 'a' the currently set duration has not reached the minimum time at step S1940.

Thereafter, the signal control system may generate a control signal according to the set duration at step S1950.

Meanwhile, when it is determined that the waiting time has not elapsed at step S1910 or it is determined that the congestion level is equal to or higher than a reference value at step S1920, the currently set duration may be maintained and the process may be returned to initial step S1510.

In this case, in the examples shown in FIGS. 18 and 19, the two reference values may be set to different values.

According to this technology, the signal control system may control a traffic signal based on congestion level information for each driving direction, thereby enabling a congestion level to be mitigated rapidly.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit (s).'

In addition, components and 'unit(s)' may be implemented to run one or more CPUs in a device or secure multimedia card.

Each of the signal control methods according to the embodiments described with reference to FIGS. 12 to 19 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, each of the signal control methods according to the embodiments described with reference to FIGS. 12 to 19 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, each of the signal control methods according to the embodiments described with reference to FIGS. 12 to 19 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A signal control system comprising:
an image detection device for providing detection information to a traffic signal controller; and
the traffic signal controller configured to receive the detection information from the image detection device, and to generate control information about a signal to be flickered in traffic lights based on the received detection information,
wherein the image detection device comprises:
a photographing unit configured to acquire an intersection image by capturing an image of an intersection;
a control unit configured to generate the detection information, including information about a vehicle-occupied or -unoccupied state for each of one or more detection channels set on a plane of the intersection by analyzing the intersection image acquired by the photographing unit; and
a communication unit configured to transmit the detection information, generated by the control unit, to the traffic signal controller,
wherein the traffic signal controller comprises:
at least one option board configured to receive the detection information from the image detection device, and to generate detection data by converting the detection information into the detection data including 4-bit channel information for each detection channel;
a main board configured to receive the detection data from the option board, and to generate a control signal for actuated control or spillback control of the intersection; and
a signal drive unit configured to receive the control signal from the main board, to generate a drive signal for the traffic lights according to the control signal, and to transfer the generated drive signal to the traffic lights,
wherein when generating the detection data, the option board writes information, indicating a vehicle-occupied or -unoccupied state for the detection channel included in the detection information, in one bit included in the channel information and writes information indicating a state of the image detection device in remaining three bits, and
wherein channel information for four or eight detection channels is included in one piece of the detection data.

2. The signal control system of claim 1, wherein the control unit acquires location coordinates of each object within the intersection image by using an artificial neural network that receives an intersection image as an input, recognizes an object included in the intersection image and estimated to be a vehicle, and outputs information on a location of the recognized object, converts the acquired location coordinates of each object within the intersection image into location coordinates on the plane of the intersection, and then determines the detection channel to be in an occupied state when the resulting location coordinates are included in the detection channel.

3. The signal control system of claim 1, wherein the control unit extracts pixels corresponding to a vehicle by using an artificial neural network that receives an intersection image as an input and outputs a probability map indicating a probability that each pixel included in the intersection image corresponds to a vehicle, converts each of the extracted pixels into a pixel on the plane of the intersection, and determines a vehicle-occupied or -unoccupied state for the detection channel according to a number of resulting pixels included in the detection channel.

4. The signal control system of claim 1, wherein the detection channel is set for each lane of a stop line of an entry to the intersection, and is set for each lane or each road of a standby line spaced apart backward from the stop line by a preset distance.

5. The signal control system of claim 1, wherein the detection channel is set for an exit from the intersection or for each lane of the exit.

6. The signal control system of claim 1, further comprising:
the traffic lights configured to be driven under a control of the traffic signal controller.

7. The signal control system of claim 1, wherein:
the image detection device generates the detection information at a period corresponding to an integer multiple of a period at which the option board transfers the detection data to the main board, and transfers the detection information to the option board; and the option board repeatedly generates detection data, generated using the detection information received from the image detection device, a number of times equal to the integer multiple.

8. The signal control system of claim 1, wherein:

the image detection device differentiates a total of 64 detection channels, and generates the detection information for each of the detection channels; and the option board is matched to every eight detection channels.

9. A signal control method performed by a signal control system including an image detection device and a traffic signal controller, the signal control method comprising:

acquiring an intersection image by capturing an image of an intersection;

generating detection information, including information about a vehicle-occupied or -unoccupied state for each of one or more detection channels set on a plane of the intersection by analyzing the intersection image;

generating detection data by converting the detection information into 4-bit channel information for each of the detection channels;

generating a control signal for actuated control or spillback control of the intersection based on the detection data; and transferring a drive signal to traffic lights based on the control signal, wherein generating the detection data comprises writing information, indicating a vehicle-occupied or -unoccupied state for the detection channel included in the detection information, in one bit included in the channel information and writing information indicating a state of the image detection device in remaining three bits, and wherein channel information for four or eight detection channels is included in one piece of the detection data.

10. The signal control method of claim 9, wherein generating the detection information comprises:

acquiring location coordinates of each object within the intersection image by using an artificial neural network that receives an intersection image as an input, recognizes an object included in the intersection image and estimated to be a vehicle, and outputs information on a location of the recognized object;

converting the acquired location coordinates of each object within the intersection image into location coordinates on the plane of the intersection;

determining the detection channel to be in an occupied state when the resulting location coordinates are included in the detection channel, and determining the detection channel to be in an unoccupied state when the resulting location coordinates are not included in the detection channel; and generating the detection information according to the determined state.

11. The signal control method of claim 9, wherein generating the detection information comprises:

extracting pixels corresponding to a vehicle by using an artificial neural network that receives an intersection image as an input and outputs a probability map indicating a probability that each pixel included in the intersection image corresponds to a vehicle;

converting each of the extracted pixels into a pixel on the plane of the intersection;

determining the detection channel to be in an occupied state when a number of resulting pixels included in the detection channel is equal to or larger than a preset number, and determining the detection channel to be in an unoccupied state when the number of resulting pixels included in the detection channel is smaller than the preset number; and generating the detection information according to the determined state.

12. The signal control method of claim 9, wherein generating the detection information comprises repeatedly generating the detection data based on a period at which the option board receives the detection information from the image detection device and a period at which the option board transfers the detection data to the main board.

13. A computer-readable non-transitory storage medium having stored thereon a program for performing the signal control method of claim 9.

* * * * *